(12) United States Patent
Villa et al.

(10) Patent No.: US 6,550,012 B1
(45) Date of Patent: Apr. 15, 2003

(54) ACTIVE FIREWALL SYSTEM AND METHODOLOGY

(75) Inventors: Emilio Villa, Ben Lomond, CA (US); Adrian Zidaritz, Danville, CA (US); Michael David Varga, Santa Clara, CA (US); Gerhard Eschelbeck, Peuerbach (AT); Michael Kevin Jones, Sunnyvale, CA (US); Mark James McArdle, San Carlos, CA (US)

(73) Assignee: Network Associates, Inc., Santa Clara, CA (US)

( * ) Notice: Subject to any disclaimer, the term of this patent is extended or adjusted under 35 U.S.C. 154(b) by 0 days.

(21) Appl. No.: 09/328,177

(22) Filed: Jun. 8, 1999

Related U.S. Application Data

(60) Provisional application No. 60/111,870, filed on Dec. 11, 1998.

(51) Int. Cl.[7] .................................................. G06F 11/30
(52) U.S. Cl. ........................ 713/201; 713/200; 713/168; 713/170
(58) Field of Search ................................ 713/201, 200, 713/168, 170

(56) References Cited

U.S. PATENT DOCUMENTS

| | | | |
|---|---|---|---|
| 5,790,790 A | * 8/1998 | Smith et al. | 709/206 |
| 5,802,178 A | * 9/1998 | Holden et al. | 713/151 |
| 5,815,657 A | * 9/1998 | Williams et al. | 713/200 |
| 5,828,832 A | * 10/1998 | Holden et al. | 713/201 |

* cited by examiner

*Primary Examiner*—Thomas R. Peeso
(74) *Attorney, Agent, or Firm*—Patrick J. S. Inouye; Christopher J. Hamaty

(57) ABSTRACT

System and methodology providing automated or "proactive" network security ("active" firewall) are described. The system implements methodology for verifying or authenticating communications, especially between network security components thereby allowing those components to share information. In one embodiment, a system implementing an active firewall is provided which includes methodology for verifying or authenticating communications between network components (e.g., sensor(s), arbiter, and actor(s)), using cryptographic keys or digital certificates. Certificates may be used to digitally sign a message or file and, in a complementary manner, to verify a digital signature. At the outset, particular software components that may participate in authenticated communication are specified, including creating a digital certificate for each such software component. Upon detection by a sensor that an event of interest that has occurred in the computer network system, the system may initiate authenticated communication between the sensor component and a central arbiter (e.g., "event orchestrator") component, so that the sensor may report the event to the arbiter or "brain." Thereafter, the arbiter (if it chooses to act on that information) initiates authenticated communication between itself and a third software component, an "actor" component (e.g., "firewall"). The arbiter may indicate to the actor how it should handle the event. The actor or firewall, upon receiving the information, may now undertake appropriate action, such as dynamically creating or modifying rules for appropriately handling the event, or it may choose to simply ignore the information.

60 Claims, 8 Drawing Sheets

ACTIVE FIREWALL SYSTEM AND METHODOLOGY

RELATED APPLICATIONS

The present application claims the benefit of priority from and is related to the following commonly-owned U.S. provisional application: application Ser. No. 60/111,870, filed Dec. 11, 1998. The disclosure of the foregoing application is hereby incorporated by reference in its entirety, including any appendices or attachments thereof, for all purposes.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to computer networks and, more particularly, to system and methods for facilitating the detection of events occurring in a computer network system (e.g., detection of vulnerability) and secure communication of such events within the system, as well as automated responses to such events.

The first personal computers were largely stand-alone units with no direct connection to other computers or computer networks. Data exchanges between computers were mainly accomplished by exchanging magnetic or optical media such as floppy disks. Over time, more and more computers were connected to each other using Local Area Networks or "LANs." In both cases, maintaining security and controlling what information a user of a personal computer can access was relatively simple because the overall computing environment was limited and clearly defined.

With the ever-increasing popularity of the Internet, particularly the World Wide Web ("Web") portion of the Internet, however, more and more personal computers are connected to larger networks. Providing access to vast stores of information, the Internet is typically accessed by users through Web "browsers" (e.g., Microsoft Internet Explorer™ or Netscape Navigator™) or other "Internet applications." Browsers and other Internet applications include the ability to access a URL (Universal Resource Locator) or "Web" site. The explosive growth of the Internet had a dramatic effect on the LANs of many businesses and other organizations. More and more employees need direct access through their corporate LAN to the Internet in order to facilitate research, competitive analysis, communication between branch offices, and send e-mail, to name just a few.

As a result, corporate IT (Information Technology) departments now face unprecedented challenges. Specifically, such departments, which have to date operated largely in a clearly defined and friendly environment, are now confronted with a far more complicated and hostile situation. As more and more computers are now connected to the Internet, either directly (e.g., over a dial-up connection with an Internet Service Provider or "ISP") or through a gateway between a LAN and the Internet, a whole new set of challenges face LAN administrators and individual users alike: these previously-closed computing environments are now opened to a worldwide network of computer systems. In particular, systems today are vulnerable to attacks by practically any perpetrators (hackers) having access to the Internet.

The general problem facing network environments is that security coverage/protection is generally not available 24 hours a day, seven days a week, at least not without great cost. Nevertheless, corporate networks are typically kept running at all times for various reasons, such as for hosting Web sites, FTP (File Transfer Protocol) sites, and the like. Although it is generally impractical to keep an IT team around 24 hours a day, seven days a week, corporate networks remain under constant threat of "attack," from both inside and outside sources.

There are several potential sources of attack. For example, an "inside" attack may occur as a result of the unauthorized act of an employee setting up a bogus FTP site, such as one containing confidential information that is not protected from access from outside the company. Another example of an inside attack is the unauthorized act of setting up a mail server (e.g., SMTP server) inside a corporate network, for sending unauthorized e-mail (e.g., completely bypassing company safeguards). "Outside" attacks typically occur as a result of unauthorized access to one's network by an outside perpetrator, that is, one existing outside the corporate "firewall." A typical example of such an attack would include unauthorized access to a valid FTP site which has accidentally been configured to have "writeable" directories which are not known to exist.

Firewalls are applications that intercept the data traffic at the gateway to a wide area network (WAN) and try to check the data packets (i.e., Internet Protocol packets or "IP packets") being exchanged for suspicious or unwanted activities. Initially firewalls have been used primarily to keep intruders from the LAN by filtering data packets. More recently, the concept has been expanded to include "proxy-based" firewall protection. A proxy-based firewall is one in which all relevant protocols are handled by an individual proxy, positioned (conceptually) between the incoming network card and the outgoing network card. In this manner, the proxy-based firewall can receive a connection from one side (e.g., incoming side) and apply relevant security checks before re-opening a corresponding connection on the other side (e.g., outgoing side).

Even with the availability of firewall technology, present-day techniques for detecting system compromise and vulnerabilities have occurred in a fairly non-automated fashion. Typically, an IT team routinely scans a company's network using scanning software, reviews a report of vulnerabilities, and then decides what firewall rules, if any, should be written. A particular problem with this approach is that existing firewalls have not, to date, served as an adequate substitute for IT personnel themselves. This stems from the fact that existing firewalls are simply static in nature and, thus, are unable to participate in a proactive, or even reactive, manner. When a breach in the network security or attack occurs, a firewall can only correctly handle the event if it has been programmed beforehand (e.g., by a system administrator) with a rule appropriate for the event. Since a firewall essentially serves as a repository of static rules, its functionality is limited by the ability of its system administrator to anticipate events and create rules for handling those events.

Often, however, an event will occur for which there is no rule. Since firewall rules themselves are not proactive, the firewall itself is unable to appropriately handle the event. Thus, events often require human intervention for appropriate handling. As these attacks can happen quite rapidly, such manual human intervention is itself often inadequate. Frequently, by the time IT personnel has detected an attack, it is too late: the damage (e.g., unauthorized access to confidential information) has already been done.

What is needed is a system with methodology that provides proactive protection for computer networks, thereby eliminating the need for continual, manual supervision and intervention for securing one's corporate network. Moreover, the underlying security and integrity of the proactive system itself should be assured, including communications within the system, so that the system itself does not introduce vulnerability to the network. In this manner, such a system may be employed to free IT personnel from the task of having to search for, and appropriately handle, system compromises in a non-automated manner. The present invention fulfills this and other needs.

SUMMARY OF THE INVENTION

System and methodology providing automated or "proactive" network security ("active" firewall) are described. In one embodiment, a system implementing an active firewall is provided which includes methodology for verifying or authenticating communications between network components (e.g., sensor(s), arbiter(s), and actor(s)), using cryptographic keys or digital certificates. Certificates may be used to digitally sign a message or file and, in a complementary manner, to verify a digital signature. These "digital signatures" allow authentication of messages, such that forgery of a signed message is not computationally feasible.

A methodology of the present invention for providing an active firewall may be summarized as follows. At the outset, particular software components that may participate in authenticated communication are specified, including creating a digital certificate for each such software component. The system has been configured by a system administrator for specifying which components of the system may participate in the process. Next, an event of interest occurs in the system, such as detection of a compromise or vulnerability in the system by a sensor (e.g., scanner). Upon occurrence of the event, the sensor component communicates information about the event in a secure, authenticated manner with another "listener" component, an arbiter or Event Orchestrator (EO).

Because of the system's existing configuration, the system already stores in its repository signed digital certificates (i.e., signed by the system administrator) for the two components, so that the components can proceed to engage in a digital conversation (i.e., communication session). Here, the sender—acting as a "sender"—invokes the following substeps for effecting authenticated communication with one or more listeners. First, the sender creates a "certogram"—that is, a packet of information describing the event which is organized into a format suitable for transmission. In the currently-preferred embodiment, a certogram may be constructed using attribute/value pairs in plain text, such as <attribute>=<value>, with a delimiter employed for separating one pair from the next. The sender determines which component(s) are its listeners. This determination is performed by simply enumerating those component(s) that have been specified in the system configuration to be listeners for this component (e.g., sensor). The components in the system may be specified by an IP (Internet Protocol) address or other identification scheme.

Now, a socket connection may be established. In the currently-preferred embodiment, this is performed through PGP™ TLS using a sequence of API (application programming interface) calls into the PGPsdk™ run-time library. Here, the component opens a socket connection (communication to a particular IP address on a particular port), binds that to a session, and then broadcasts a message to that port announcing its presence. At this point in the process, the communication socket is simply a conventional stream socket; communication is not yet authenticated. If a listener is present, that listener will respond with an acknowledgment accepting the socket connection. An acknowledgment may be received back from one or more listeners. Now that the communication layer is established, the method may proceed to the next substep, for exchanging certificates with the listener(s).

The respective sender/listener(s) components each validate the certificate received from the other. Validation may proceed in a conventional manner, for example using X.509 validation, including determining the level of trust and validity (including, for instance, the expiration, revocation, and disablement) of a given certificate. If each respective component is able to successfully validate the certificate received from the other, secure communication ensues. From that point on, communication occurs in a secure, authenticated manner, with each message or blob being digitally signed or fingerprinted, for instance, using a cryptographic hash or message digest. Any alteration to the message breaks the digital fingerprint and, therefore, may easily be detected. If desired, encryption may also be (optionally) applied to the communication messages. In those embodiments intended for export from the United States, however, encryption may be limited (e.g., as to key length) or removed.

Upon return back to the main or controlling method (i.e., after completion of the foregoing substeps), the listener(s) decides whether to act on or pass on the event reported by the certogram, or simply to ignore it. If the event is not to be acted on or passed on, the method is done. Typically, however, the reported event maps to a script-defined event handler in the listener (e.g., Event Orchestrator or EO) which, in turn, desires to notify yet another listener, the actor (e.g., firewall). Communication may therefore continue with the arbiter (EO) communicating with the target actor(s) in an authenticated manner, as above, with the arbiter (EO) as the sender and the actor (firewall) as the listener. The actor or firewall, upon receiving the certogram, may now undertake appropriate action, such as dynamically creating or modifying rules for appropriately handling the event, or it may choose to ignore the event (e.g., if the event is a duplicate of a previous event or if the event is covered by (or is a sub-set of) an existing firewall rule).

GLOSSARY

Figure 1:
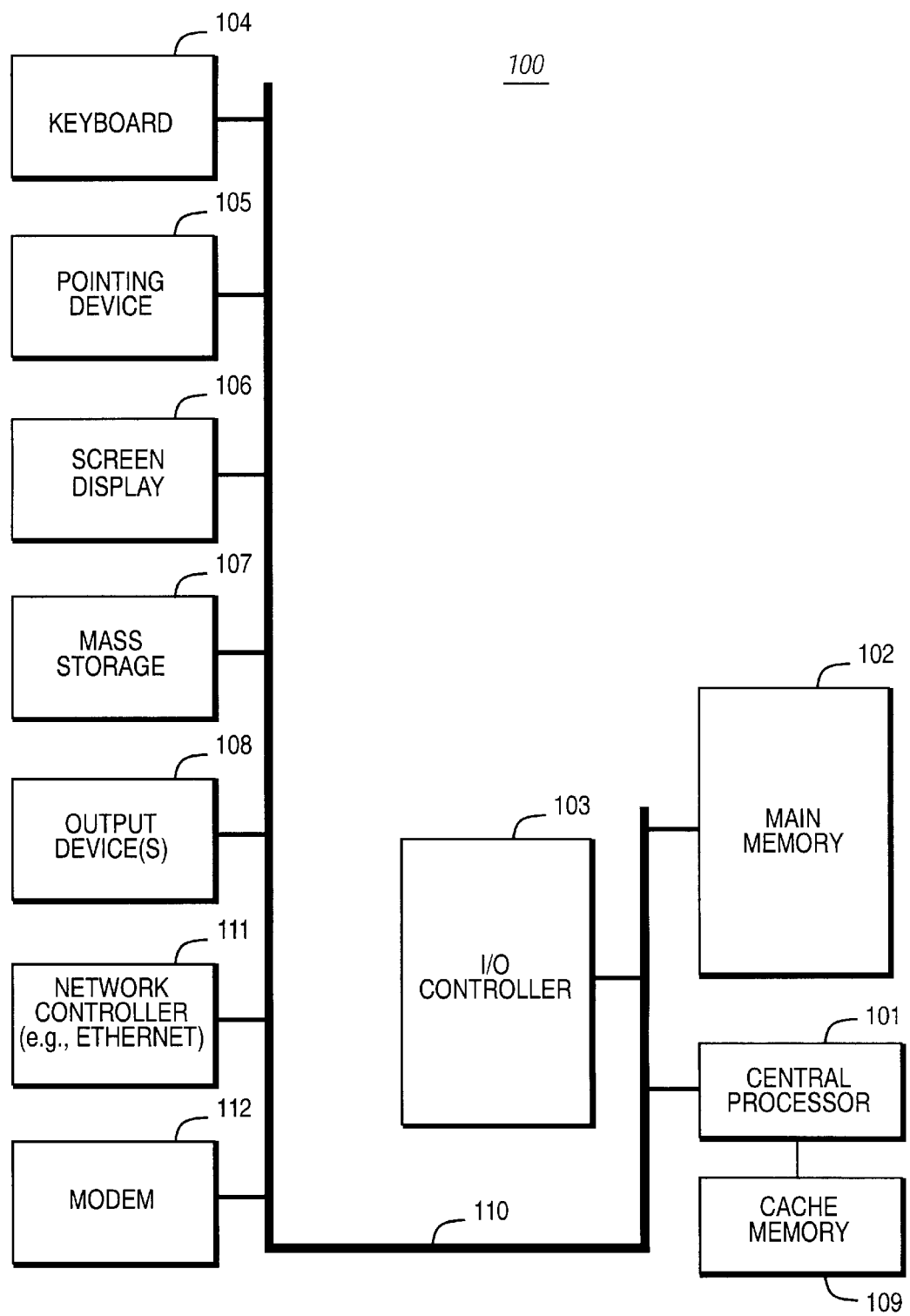
FIG. 1 is a high-level block diagram illustrating a computer in which the present invention may be embodied.

The following definitions are offered for purposes of illustration, not limitation.

Actor: A device or computer-implemented process that actively responds to a particular situation, such as a "firewall" or "router." A firewall may, for instance, actively close a particular port in response to a given situation.

Arbiter: A device or computer-implemented process that serves as a central "brain" for coordinating events which occur in a system (e.g., network). For instance, an "Event Orchestrator" (EO) may be employed as a system's arbiter for handling events which are detected in a system.

Authentication: The determination of the origin of encrypted information through the verification of someone's digital signature or someone's public key by checking its unique fingerprint.

Certogram: A blob or chunk of data comprising value/attribute pairs, which may be employed for transmitting information about an event detected in a network system.

Certify: To sign another person's public key.

Certifying Authority: One or more trusted individuals are assigned the responsibility of certifying the origin of keys and adding them to a common database.

Decryption: A method of unscrambling encrypted information so that it becomes legible again. The recipient's private key is used for decryption.

Digital Signature: See signature.

Encryption: A method of scrambling information to render it unreadable to anyone except the intended recipient, who must decrypt it to read it.

Key: A digital code used to encrypt, sign, decrypt and verify e-mail messages and files. Keys come in key pairs and are stored on keyrings.

Key Escrow: A practice where a user of a public key encryption system surrenders their private key to a third party thus permitting them to monitor encrypted communications.

Key Fingerprint: A uniquely identifying string of numbers and characters used to authenticate public keys. For example, one can telephone the owner of a public key and have him or her read the fingerprint associated with their key so one can compare it with the fingerprint on one's copy of their public key to see if they match. If the fingerprint does not match, then one knows one has a bogus key.

Key ID: A legible code that uniquely identifies a key pair. Two key pairs may have the same User ID, but they will have different Key IDs.

Key Pair: A public key and its complimentary private key. In public-key cryptosystems, like the PGP™ program, each user has at least one key pair.

Keyring: A set of keys. Each user has two types of keyrings: a private keyring and a public keyring.

Message Digest: A compact "distillate" of one's message or file checksum. It represents one's message, such that if the message were altered in any way, a different message digest would be computed from it.

Passphrase: A series of keystrokes that allow exclusive access to one's private key which one uses to sign and decrypt e-mail messages and file attachments.

Plaintext: Normal, legible, unencrypted, unsigned text.

Private Key: The secret portion of a key pair used to sign and decrypt information. A user's private key should be kept secret, known only to the user.

Private Keyring: A set of one or more private keys, all of which belong to the owner of the private keyring.

Public Key: One of two keys in a key pair used to encrypt information and verify signatures. A user's public key can be widely disseminated to colleagues or strangers. Knowing a person's public key does not help anyone discover the corresponding private key.

Public Keyring: A set of public keys. One's public keyring includes one's own public key(s).

Public-Key Cryptography: Cryptography in which a public and private key pair is used, and no security is needed in the channel itself.

Sign: To apply a signature.

Signature: A digital code created with a private key. Signatures allow authentication of information by the process of signature verification. When one signs a message or file, the PGP™ program uses one's private key to create a digital code that is unique to both the contents of the message and one's private key. Anyone can use one's public key to verify one's signature.

Sensor: Any type of device or computer-implemented process for gathering information about a network. Examples of sensor-type software include scanners (including anti-virus scanners), monitors (i.e., software which "listens" for network intrusions), sniffers, or the like.

Text: Standard, printable text (e.g., 7-bit ASCII text).

Trusted: A public key is said to be trusted by the user if it has been certified by the user or by someone the user has designated as an introducer.

User ID: A text phrase that identifies a key pair. For example, one common format for a User ID is the owner's name and e-mail address. The User ID helps users (both the owner and colleagues) identify the owner of the key pair.

Verification: The act of comparing a signature created with a private key to its public key. Verification proves that the information was actually sent by the signer, and that the message has not been subsequently altered by anyone else.

DETAILED DESCRIPTION OF A PREFERRED EMBODIMENT

The following description will focus on the presently-preferred embodiment of the present invention, which is operative in an Internet-connected environment, including, for instance, client machines running under a client operating system (e.g., the Microsoft® Windows 9x environment) and connected to a network running under a network operating system (e.g., the Microsoft® Windows NT or Windows 2000 environment), with connectivity to an open network such as the Internet. The present invention, however, is not limited to any particular one application or any particular environment. Instead, those skilled in the art will find that the system and methods of the present invention may be advantageously applied to a variety of system and application software, including database management systems, word processors, spreadsheets, and the like, operating on a variety of different platforms, including Macintosh®, UNIX®, NextStep®, Linux™, and the like. Therefore, the description of the exemplary embodiments which follows is for purposes of illustration and not limitation.

Computer System Architecture

A. Hardware for listeners (e.g., firewall) and senders (e.g., scanner)

The invention is generally embodied on a computer system including one or more computer systems, such as computer system 100 of FIG. 1, operating on a network. System 100 comprises a central processor 101, a main memory 102, an input/output controller 103, a keyboard 104, a pointing device 105 (e.g., mouse, track ball, pen device, or the like), a display or screen device 106, and a mass storage 107 (e.g., hard or fixed disk, removable floppy disk, optical disk, magneto-optical disk, or flash memory), a network controller or interface card 111 (e.g., Ethernet), and a modem 112 (e.g., 28.8 K baud modem or ISDN modem). Although not shown separately, a real-time system clock is included with the system 100, in a conventional manner. Processor 101 includes or is coupled to a cache memory 109 for storing frequently accessed information; memory 109 may be an on-chip cache or external cache (as shown). One or more input/output (I/O) controllers(s) or device(s) 108 are included in the system 100, as desired. I/O devices 108 may include, for instance, a laser printer, such as an HP LaserJet® printer available from Hewlett-Packard of Palo Alto, Calif. As shown, the various components of the system 100 communicate through a system bus 110 or similar architecture. The system itself communicates with other systems via the network interface card (NIC) 111 (e.g., available from 3Com of Santa Clara, Calif.) and/or modem 112 (e.g., also available from 3Com), connected to a network (e.g., Ethernet network). In a preferred embodiment, the system 100 includes an IBM PC-compatible personal computer, available from a variety of vendors (including IBM of Armonk, N.Y.).

B. System software

Figure 2:
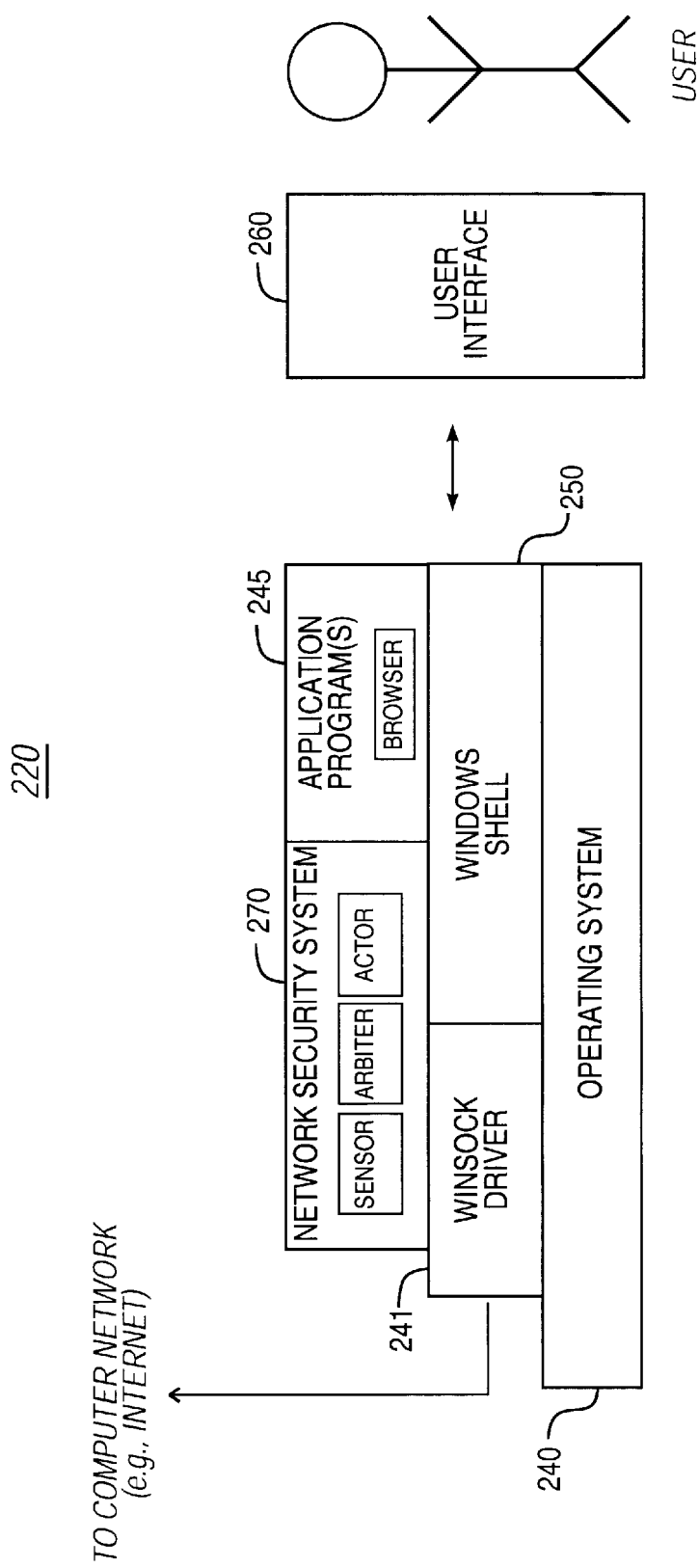
FIG. 2 is a high-level block diagram illustrating a software system for controlling the operation of the computer of FIG. 1, including sensor(s), arbiter(s), and actor(s) network security components.

Illustrated in FIG. 2, a computer software system 220 is provided for directing the operation of the computer system 100. Software system 220, which is stored in system memory 102 and on storage (e.g., disk memory) 107, includes a kernel or operating system (OS) 240 and a windows shell 250 (e.g., integrated into the OS or standalone). One or more application programs, such as client application software or "programs" 245 may be "loaded" (i.e., transferred from storage 107 into memory 102) for execution by the system 100. The software system 220 includes a communication layer or driver 241 (e.g., Microsoft Winsock) for effecting communication with a network, such as the Internet.

System 220 includes a user interface (UI) 260, preferably a Graphical User Interface (GUI), for receiving user commands and data. These inputs, in turn, may be acted upon by the system 100 in accordance with instructions from OS module 240, windows shell 250, and/or client application module(s) 245. The UI 260 also serves to display the results of operation from the OS 240, windows shell 250, and application(s) 245, whereupon the user may supply additional inputs or terminate the session. OS 240, windows shell 250, and UI 260 can be provided by Microsoft® Windows 95/98, or by Microsoft® Windows NT/2000 (available from Microsoft Corporation of Redmond, Wash.). Alternatively, these can be provided by IBM OS/2 (available from IBM of Armonk, N.Y.), Macintosh OS (available from Apple Computers of Cupertino, Calif.), or Linux (available from a variety of vendors). Although shown conceptually as separate modules, windows shell 250 and UI 260 are typically provided by OS vendors as integral parts of the operating system (here, OS 240).

As is also shown in FIG. 2, the software system 220 includes a network security system 270 of the present invention. The network security system 270, which includes sensor(s), arbiter(s), and actor(s) network security components in communication with one another through a secured communication layer, implements an active firewall architecture and methodology of the present invention for protecting one's network. Although the network security components are shown implemented in a single computer (i.e., system 100 operating under the control of software system 220), the components may be implemented in a single computer system or multi-computer system, as desired. In a preferred embodiment, these components would typically reside on individual machines (e.g., each itself comprising a computer, such as system 100 operating under the control of software system 220), connected to a computer network system (e.g., corporate network with Internet connectivity).

Construction and operation of the network security system 270, in accordance with the present invention, will now be described in detail. Although the description which follows includes specific detail about network security components used in the preferred embodiment, the present invention itself does not require use of any vendor-specific components. Instead, the present invention may be implemented using sensor(s), arbiter(s), or actor(s) components other than those referenced below, including ones from third party vendors, as well as mixing and matching components from a variety of different vendors.

Active Firewall with Proactive Security Layer

A. Introduction

1. Eliminating Human-to-human Communication

An important design consideration in the creation of an active firewall of the present invention is the replacement of communication between humans with software-based communication. Consider, for instance, the following typical practice today. Suppose an IT worker running a scanner program discovers a vulnerability on a company network. If that individual does not have appropriate access level (i.e., system privileges) to make modifications for correcting the situation (as is often the case), he or she will have to inform the appropriate member of the IT team who is capable of making the appropriate changes. In this act of human-to-human communication, it is taken for granted that the communication is secure—that is, that there is no unauthorized participant or listener. In other words, the communication occurs in a manner such that "spoofing" is not possible. Thus, in this example, the IT worker achieves secure, authenticated communication by telling someone that he or she personally knows and trusts.

Automation of this level of communication in software exposes the network to potential problems, however. For instance, an unauthorized party may be listening in and may therefore also be privy to the newly-uncovered vulnerabilities discovered on the network. Thus, automation of communication potentially exposes the network to inappropriate dissemination of information (e.g., about network vulnerabilities) as well as allowing an unauthorized party to spoof the network (e.g., "man-in-the-middle" attack). Therefore, an important design consideration is that communication within the system is secure—that is, capable of authentication (e.g., using X.509 certificates). Although authentication itself does not require encryption, the communications may also be (optionally) encrypted, if desired, for thwarting an unauthorized listener.

2. General Applicability of Secured Intra-system Communication

Although the authenticated communication approach of the present invention is employed, in a preferred embodiment, for implementing proactive network security (i.e., active firewall), the approach has general applicability beyond such an implementation. Instead, the approach may be applied to any application where system-wide secure communication is desired. Thus, the present invention may be applied not only for managing network security but, also, any task which requires communication or coordination among components of a system where authentication of those components participating is desirable. For instance, the approach may be employed for automating system-critical functions of a system, updating of the system or extending system configuration information. In this manner, therefore, the communication approach of the present invention may be employed to allow different modules or pieces of software within a system (e.g., corporate network) to exchange information in an automated, yet secure, manner.

3. Cooperative Communication Model

In the currently-preferred embodiment, communication between software modules in the active firewall (e.g., certogram-based communication) is generally cooperative. In this model, a particular software component or module may undertake to inform another software module about a particular item or event. Whether the receiving software module actually decides to act on and/or pass on that information, however, would be at its own discretion (i.e., would be permissive, not mandatory). Accordingly, communication occurs in a manner similar to that of human communication: a software module offers information to other software modules but does not, generally, control (i.e., execute commands on) the other software modules. In this manner, communication occurs in a fashion which is not only asynchronous but is also "ignoreable."

B. Proactive network security system ("active firewall")

1. Corporate Network Configuration

Figure 3A:
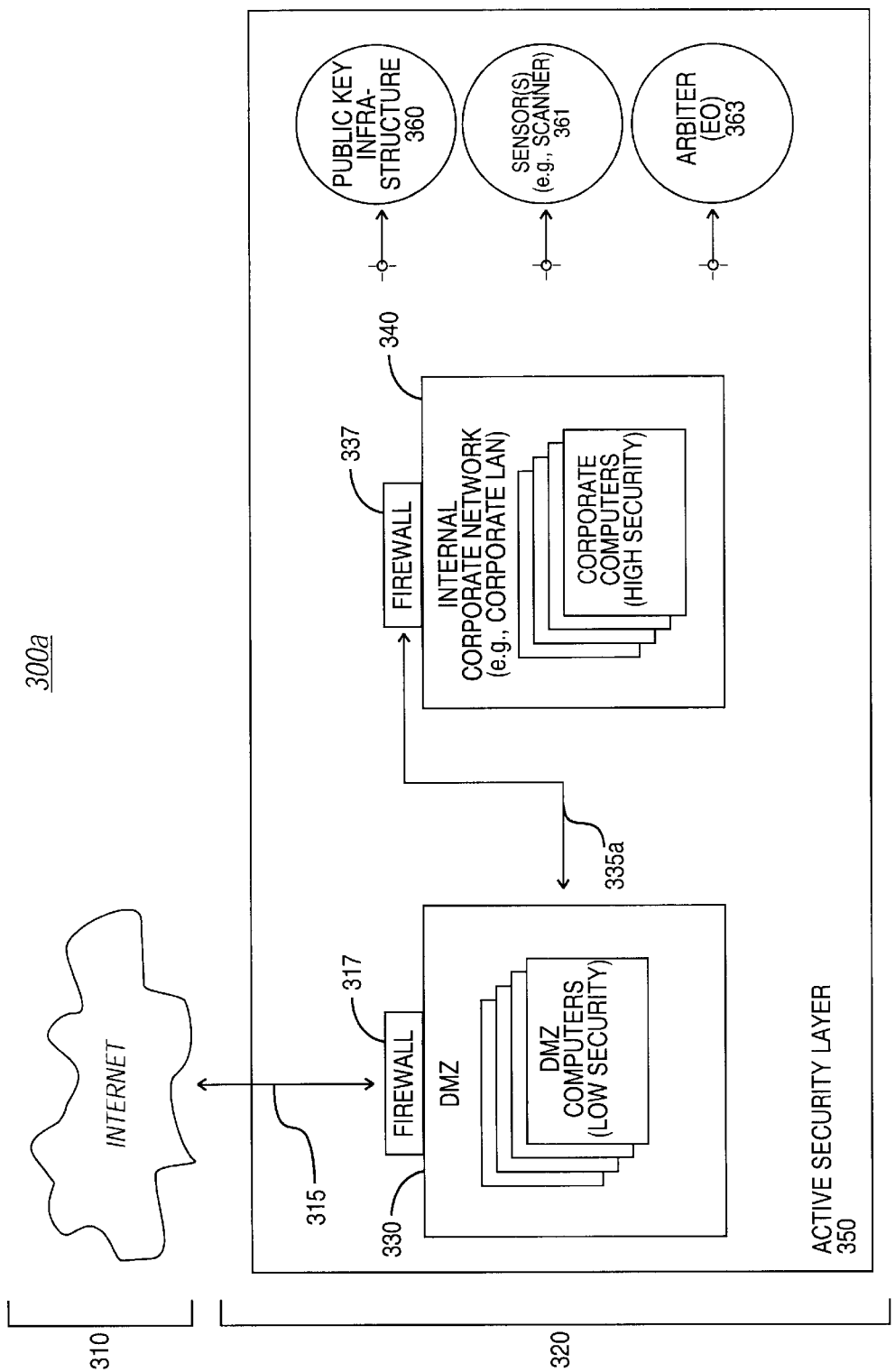
FIG. 3A is a high-level block diagram illustrating a computer network system in which the present invention is preferably embodied.

In order to understand network architecture employed in the present invention (i.e., which includes multiple connected computers), it is helpful to consider an implementation employing a simple, yet common, network: an internal company network. FIG. 3A illustrates an overview of an embodiment of the present invention implemented in such an environment. At the highest level, network system 300a includes the Internet 310 (i.e., connectivity to the outside world through the Internet) and the "corporate network" 320 (i.e., the company's computing environment apart from the Internet). Given that most companies today must have a presence on the Internet, IT departments often employ the concept of a DMZ or "de-militarized zone," which exists between a company's own internal network and the Internet. Thus, since the company wants to have a presence on the Internet but not have that presence put the corporate network at risk, the corporate network 320 includes a DMZ 330. In practice, DMZ 330 is implemented as a collection of server computers (e.g., collection of computer systems 100) that are at very low risk for incoming connections. DMZ machines are relatively unsecured for incoming connections from the Internet, so that they are relatively accessible to the outside world. Since they are easily attacked, DMZ machines would typically not store confidential information.

In stark contrast to the foregoing relatively-unsecured connection with the Internet, the connection of the DMZ machines 330 to other computers within the corporate network—corporate computers 340—is often a more secured connection, as the corporate computers 340 typically store sensitive company information. Accordingly, such an architecture would typically include an additional or secondary firewall 337 between the DMZ 330 and corporate computers 340. Thus, the connection 315 between the Internet and DMZ computers 330 is relatively unsecured, while the connection 335a between the DMZ computers 330 and corporate computers 340 generally occurs in a more secure environment (e.g., one storing more sensitive content). The net effect is that communication both to and from the DMZ machines 330 to corporate computers 340 is more sensitive to the company. Often, however, at least some access restrictions are placed on the DMZ 330. This is achieved by including a front-line or primary firewall 317 (e.g., proxy-based firewall), juxtaposed between the Internet and DMZ computers 330. This will prevent, for example, an unauthorized party from posting its own HTML files on the DMZ computers 330, for taking over the company's Web site.

The corporate network 320 is surrounded by an Active Security Layer 350 of the present invention. The layer 350, which is connected to the various components of the corporate network 320, supports authenticated communication among components within the system, through the use of digital certificates supported by a Public Key Infrastructure (PKI) 360. Here, the PKI serves as a provider of certificates. When communication between system components is desired, the components exchange digital certificates (if not done so already) and thereafter transmit authenticated messages.

Figure 3B:
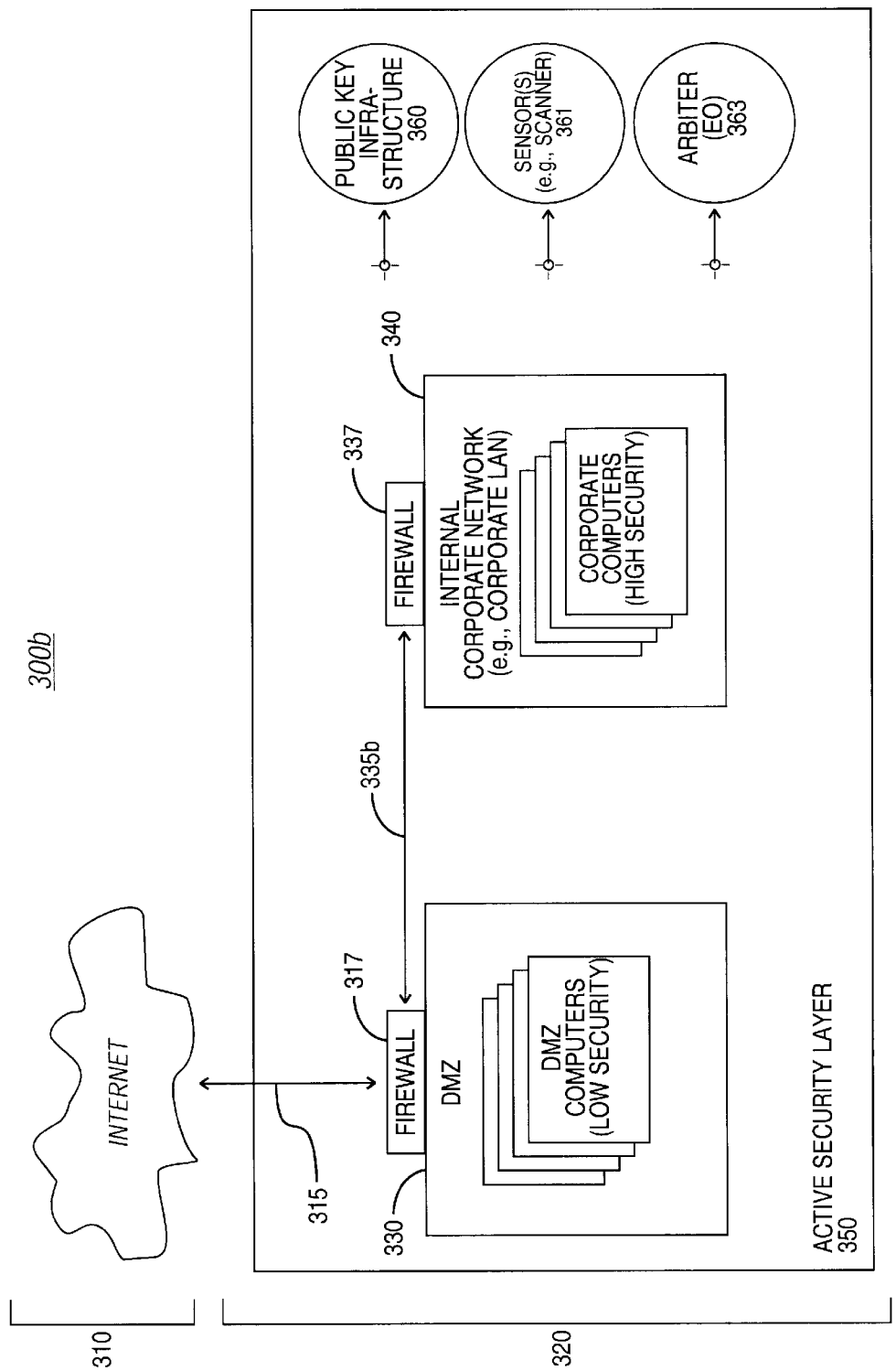
FIG. 3B is a high-level block diagram illustrating a computer network system in which the present invention is preferably embodied, having a network configuration in which a primary firewall (e.g., for DMZ computers) communicates directly with a secondary firewall (e.g., for corporate (internal) computers).
Figure 3C:
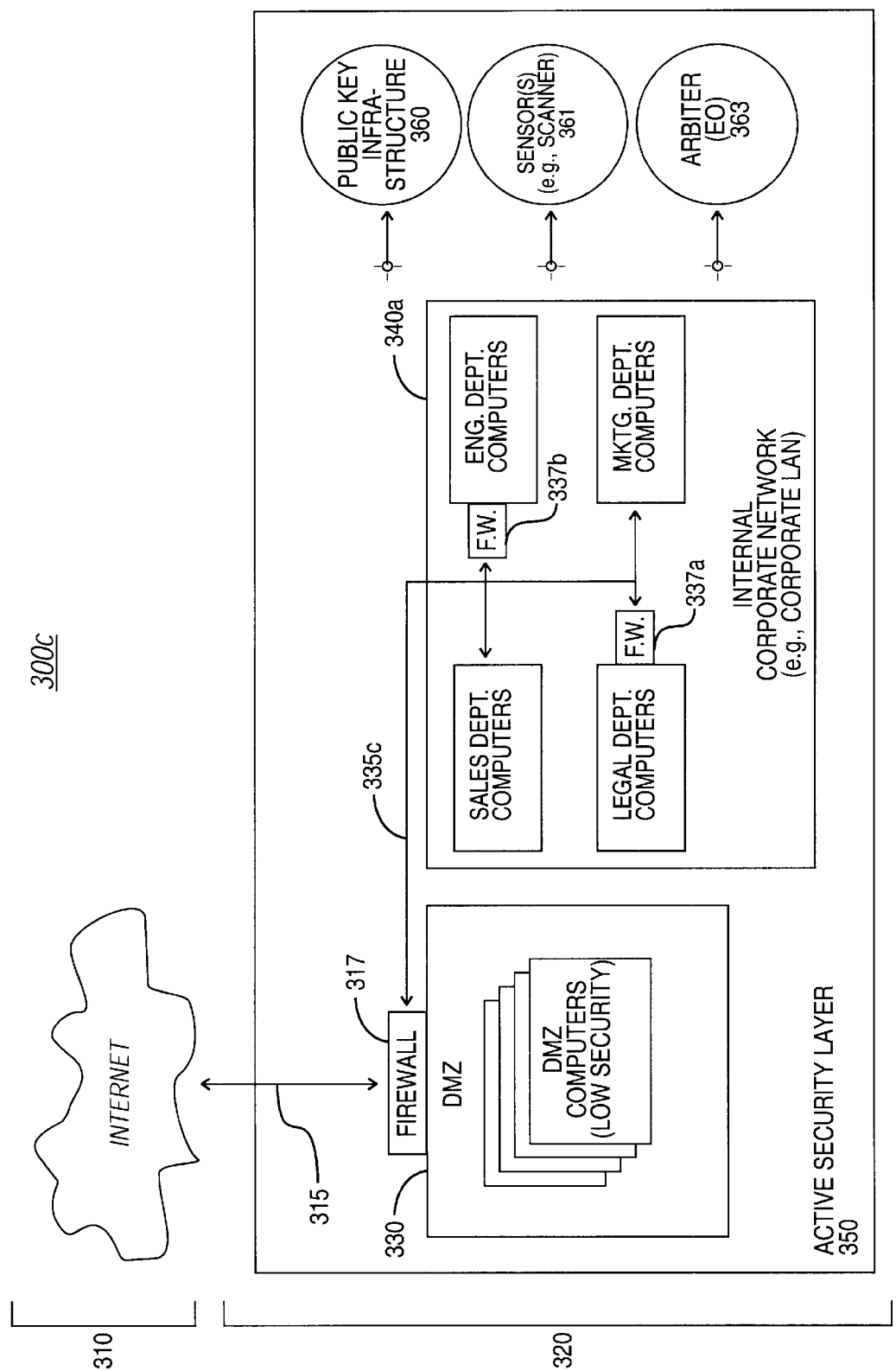
FIG. 3C is a high-level block diagram illustrating a computer network system in which the present invention is preferably embodied, having a network configuration in which a primary firewall (e.g., for DMZ computers) communicates directly with a multitude of secondary firewalls (e.g., for individual department-level corporate (internal) computers).

FIGS. 3B–C illustrate that the configuration of the firewalls of the network system can vary substantially, depending on the individual needs of the corporation. In FIG. 3B, the network system (now shown as system 300b) has been reconfigured such that the primary firewall 317 communicates directly with the secondary firewall 337 (e.g., also a proxy-based firewall), through direct connection 335b. Thus, as shown in this configuration, connection 335b does not pass through DMZ computers 330. In FIG. 3C, the network system (now shown as system 300c) has been reconfigured such that the primary firewall 317 communicates directly with a plurality of secondary firewalls (e.g., secondary firewall 337a, 337b). As in the configuration for system 300b, the configuration of system 300c provides direct communication between the primary firewall (i.e., firewall 317) and the secondary firewalls (e.g., firewalls 337a, 337b), that is, it does not pass through DMZ computers 330.

Construction and operation of the present invention implemented in a network system will now be described, with particular emphasis on methodology of the present invention for providing an active firewall. Although the following description will focus on an exemplary firewall configuration, the present invention itself is independent of any particular firewall configuration and, instead, may be implemented in any one of a variety of firewall configurations (such as shown above).

2. "Active Firewall" Components/architecture a. General Components

Figure 4:
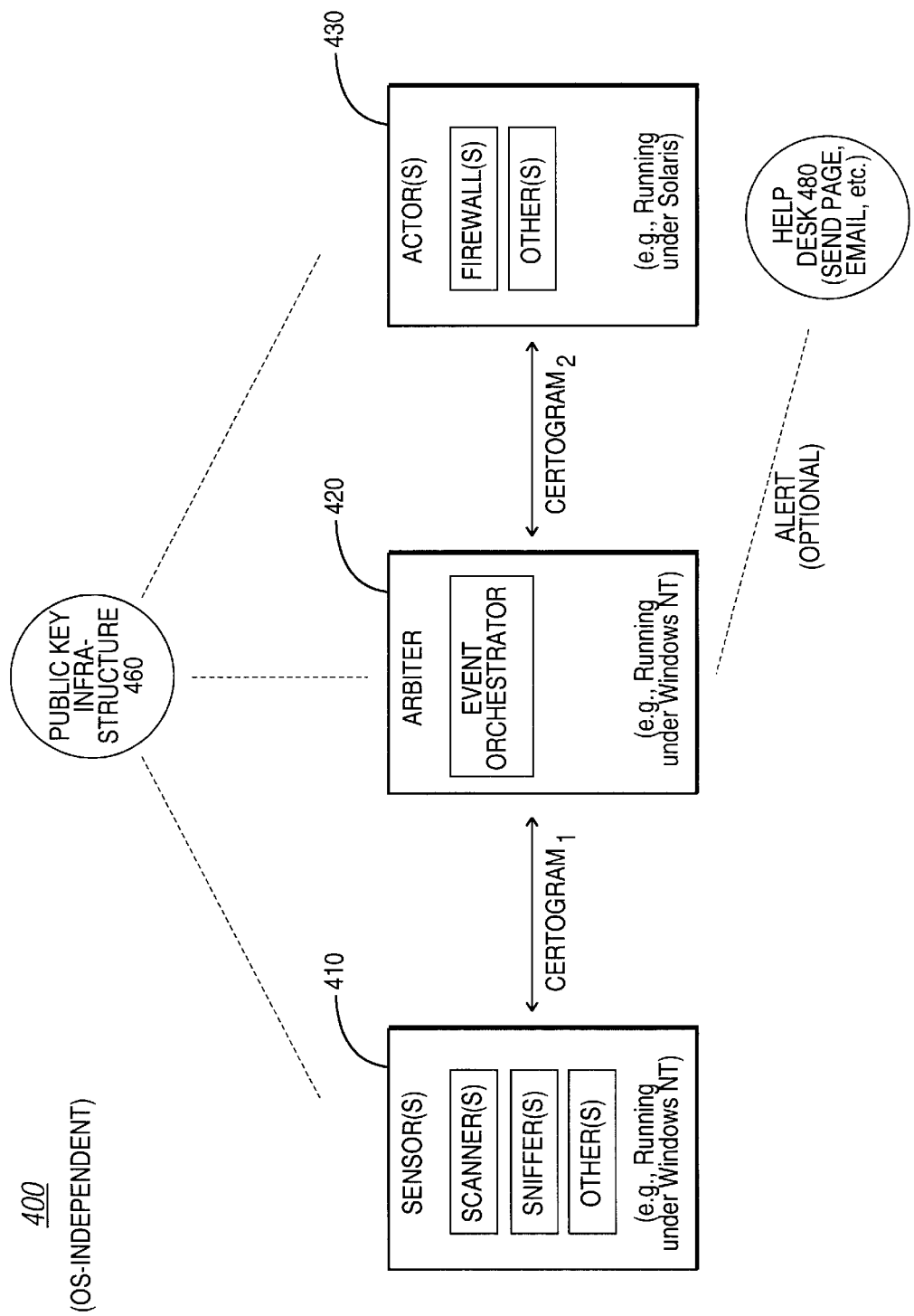
FIG. 4 is a high-level block diagram illustrating an operating system-independent network security system implementing an "active firewall" of the present invention.

As shown in FIG. 4, active firewall system 400 of the present invention includes sensor(s) 410, arbiter(s) 420, and actor(s) 430 components connected to a Public Key Infrastructure (PKI) 460, which serves as a provider of certificates. If desired, the arbiter(s) 420 may optionally be connected to a Help Desk 480, for example, for transmitting automated messages to human recipients (e.g., IT personnel). The following description focuses on a currently-preferred embodiment having a single arbiter 420; those skilled in the art will appreciate, however, that the embodiment may be extended to include multiple arbiters, if desired, thereby providing failure-safety and load-balancing features.

As shown, communication between the components is in the form of the certograms, which are described in further detail below. In a preferred embodiment, each certogram has a finite existence. For example, certogram$_1$ may be used to communicate from a particular sensor 410 (e.g., scanner) to the arbiter 420, but the arbiter 420 will not reuse certogram$_1$ to communicate with one of the actors 430 (e.g., firewall). Instead, the arbiter will create a new certogram$_2$—one specific for its communication with the (target) actor. The system itself is independent of any particular operating system, such that each component may run under the same or different operating system. The individual components themselves will now be described in further detail.

b. "Sensors"

Sensors 410 include any type of device or computer-implemented process that gathers information about a network, such as information about attacks or intrusions, vulnerabilities, network overload, and other similar conditions or events of interest. Examples of sensor-type software include scanners (including antivirus scanners), monitors (i.e., software which "listens" for network intrusions or attacks), sniffers (for detecting overload), or the like.

As a specific example, sensors 410 may include Cyber-Cop™ Scanner (available from Network Associates, Inc. of Santa Clara, Calif.), for detecting network vulnerabilities. Scanner software proactively scans available computers/hosts on a network for detecting vulnerability. In operation, scanner software performs a comprehensive examination on each host on the network that is of interest (i.e., according to how the scanner is configured). On each machine, the scanner will run a series of tests, ranging from password grinding to trace routing, for instance. The series of tests themselves are configurable. Even though the scanner software is capable of running a wide range of tests, it itself is basically a mechanism for reporting network vulnerability. In particular, the scanner software itself generally includes only rudimentary capability for fixing vulnerabilities that it finds. As a result, its primary use is to provide reports to an IT worker who must then manually correct any system vulnerabilities, when that person is available. (As described below, a firewall is generally far better equipped to fix vulnerabilities.)

In the presently-preferred embodiment, sensors 410 include Network Associates' CyberCop™ Scanner (CSC) software. CyberCop™ Scanner v5.0 (WinNT) and Cyber-Cop Scanner 2.5 (Linux) are available from Network Associates, Inc. of Santa Clara, Calif. (e.g., Part Nos./SKUs CSC-DRCT-NA-500-S1, CSC-DRCT-NA-500-S, and CSC-DRCT-NA-500-P), the documentation of which is hereby incorporated by reference. However, the present invention does not require use of scanner software but, instead, may employ other types of sensors, as desired.

c. "Arbiter" and "Actors"

The arbiter 420 may be implemented as Event Orchestrator-type (EO) software, such as "Event Orchestrator" (available from Network Associates, Inc. of Santa Clara, Calif.), to serve as a central "brain" for coordinating events which occur in a system (e.g., network). The EO is typically used, for example, to implement an electronic "Help Desk"—an automated system where users can post requests for computer-related help. In response to user-posted requests, for example, the EO can automatically generate and send appropriate messages to responsible parties, including for instance sending e-mail messages, network messages, electronic pages, or the like to IT personnel.

EO software may be extended for coordinating or orchestrating the processing of problems occurring on a network, other than user-related ones. In particular, when an event occurs in the network system, it is reported to the central brain, EO, for appropriate handling. In accordance with the present invention, when an event of interest occurs in the network, the event is reported to the EO as a "certogram." Certogram refers to authenticated communication of a message within the system, using internal digital certificate-based, authenticated communication (i.e., a "certified electronic telegram"). For instance, when a scanner detects a vulnerability in the network, it may communicate this to the EO by creating a certogram that is then transported to the EO using the underlying Active Security Layer 350, as illustrated in FIG. 3. Upon receipt of a message reporting such an event, the EO maps the certogram for appropriate action. In response to a particular message, for example, the EO itself may generate an alert to the Help Desk 480 which, in turn, transmits a human-readable message, such as an e-mail message or pager message, or the EO may generate a machine-readable message, such as a network message to one or more "actors" (typically firewalls, such as firewall 337). In either case, the EO will create a new certogram for effecting communication with its target listener.

Consider, as an example, the detection of an FTP writeable directory by a scanner. Upon receipt at the EO of a certogram reporting the problem, the EO may employ the Active Security Layer 350 to create a new certogram informing the actor (e.g., firewall) of detection of the network vulnerability and do so in an authenticated manner. Here, the network is configured at the outset (e.g., by a system administrator) to specify which components may participate in the secured communication process. For example, a system administrator may specify that a particular set of scanners (i.e., scanner software) may communicate with a particular EO. The actual configuration or registration of components is done in a manner somewhere to that used in a hierarchy ("web") of trust, where parties are introduced to one another by an "introducer."

In the presently-preferred embodiment, firewall 337 includes Network Associates' Gauntlet™ Firewall (GFX) software. Gauntlet™ Firewall (GFX), which includes Gauntlet Firewall v5.0 (Windows NT and Solaris), Gauntlet VPN 5.0 (Windows NT and Solaris), Net Tools PKI Server v1.0 (Windows NT, DSA and RSA+DSA versions), is available (per server basis) from Network Associates, Inc. of Santa Clara, Calif. in a variety of licensing configurations (e.g., Part Nos./SKUs, GFX-DRCT-NA-500-1V (1 year), GFX-DRCT-NA-500-SV (2 year), GFX-DRCT-NA-500-PV (perpetual)), the documentation of which is hereby incorporated by reference.

The firewall (actor), assured of the authenticity of the message, may create a new rule on-the-fly to address the vulnerability. Thus for the example of a writeable FTP directory, the firewall may create a rule specifically handling the vulnerability (e.g., by blocking access to a specific port or machine). Thus as demonstrated by the example, the system of the present invention supports authenticated digital certificate-based communication among the components within the network system, thus allowing those components to share information in a manner providing an active firewall or proactive network security system.

3. Cryptographic-secured System Communication

Authenticated communication placed on the underlying physical network (i.e., "wire") may be implemented using presently-available cryptographic code libraries, such as PGPsdk™ (version 1.6) available from Network Associates, Inc. of Santa Clara, Calif. In order to understand the application of such technology, it is helpful to briefly review cryptographic technology.

Generally, cryptographic systems use either "secret-key" encryption or "public key" encryption. In "secret-key" encryption, a single key is used for both encryption and decryption. Consider, for example, a user (sender) who wants to send an electronic mail or "e-mail" message to a colleague (recipient) in a secured manner, such that no one who intercepts the message will be able to read it. If the sender employs a cryptographic "secret key" to encrypt the message, the recipient, in turn, must also use the same key to decipher or decrypt the message. As a result, the same key must be initially transmitted via secure channels so that both parties can know it before encrypted messages can be sent over insecure channels. This is typically inconvenient, however. A better approach is, therefore, sought.

Public key cryptography overcomes the problem by eliminating the need for a single "secret" key. Here, each user of a public key cryptographic system has two mathematically-related keys, a "public key" and a secret or "private key." Operating in a complementary fashion, each key in the pair unlocks the code that the other key makes. Knowing the public key does not help deduce the corresponding private key, however. Accordingly, the public key can be published and widely disseminated across a communications network, such as the Internet, without in any way compromising the integrity of the private key. Anyone can use a recipient's public key to encrypt a message to that person, with the recipient, in turn, using his or her own corresponding private key to decrypt the message. One's private key, on the other hand, is kept secret, known only to the user.

Of particular interest to the present invention is use of cryptographic techniques for verifying or authenticating network communications, especially between software components. Cryptographic keys or digital "certificates" may be used to digitally sign a message or file and, in a complementary manner, to verify a digital signature. These "digital signatures" allow authentication of messages. When a user signs a message, a cryptographic program uses that user's own private key to create a digital signature that is unique to both the contents of the message and the user's private key. Any recipient can employ the user's public key to authenticate the signature. Since the signer, alone, possesses the private key that created that signature, authentication of a signature confirms that the message was actually sent by the signer, and that the message has not been subsequently altered by anyone else. Forgery of a signed message is not computationally feasible.

Authenticated communication is provided by a secured transport layer. In the presently-preferred embodiment, this secured transport layer is provided by PGP™ TLS (Transport Layer Security), which is available in run-time library form from PGPsdk™ (available from Pretty Good Privacy, Inc., a wholly-owned subsidiary of Network Associates, Inc.). PGPsdk is described in the documentation accompanying PGPsdk (including Inside the PGPsdk), the entire disclosure of which is hereby incorporated by reference. However, the Active Security Layer of the present invention may instead be implemented using other transport layers, such as SSL (Secure Socket Layer), TCP/IP (Transmission Control Protocol/Internet Protocol) with a security mechanism (e.g., third-party security mechanism), or the like. Cryptographic techniques and systems, including ones implementing public key cryptography, are well-documented in the technical, trade, and patent literature. For a general description, see e.g., Schneier, Bruce, *Applied Cryptography*, Second Edition, John Wiley & Sons, Inc., 1996. For a description focusing on the PGP™ implementation of public key cryptography, see e.g., Garfinkel, Simon, PGP™: *Pretty Good Privacy*, O'Reilly & Associates, Inc., 1995. The disclosures of each of the foregoing are hereby incorporated by reference.

During system operation, the Active Security Layer 350 (employing the PGPsdk™ run-time library) provides socket communication, establishment of communication sessions, exchanging of authentication certificates, and the like. At the time of secure communication, participating components may exchange respective digital certificates, each examining the certificate of the other for determining whether it has been signed by a party that is trusted. Here, the PKI has served as the provider of certificates. In the event that the certificates of respective components are trusted by the same party (i.e., PKI 360, as configured by the system administrator), the components may now trust one another. Thus after successfully exchanging certificates (i.e., accepted as being trusted), communications between the components may proceed in a secure manner. Since the root of trust occurs at the PKI 360, access to configuration of the PKI 360 itself for requesting/issuing certificates should be restricted (e.g., system administrator-level privileges).

With a basic understanding of the general application of cryptographic technique to communication, including the organization of the PGP™ key data structure, the reader has a foundation for understanding the teachings of the present invention for implementing an "active firewall" providing methodology for proactive management of network security.

C. General methodology

Figure 5A:
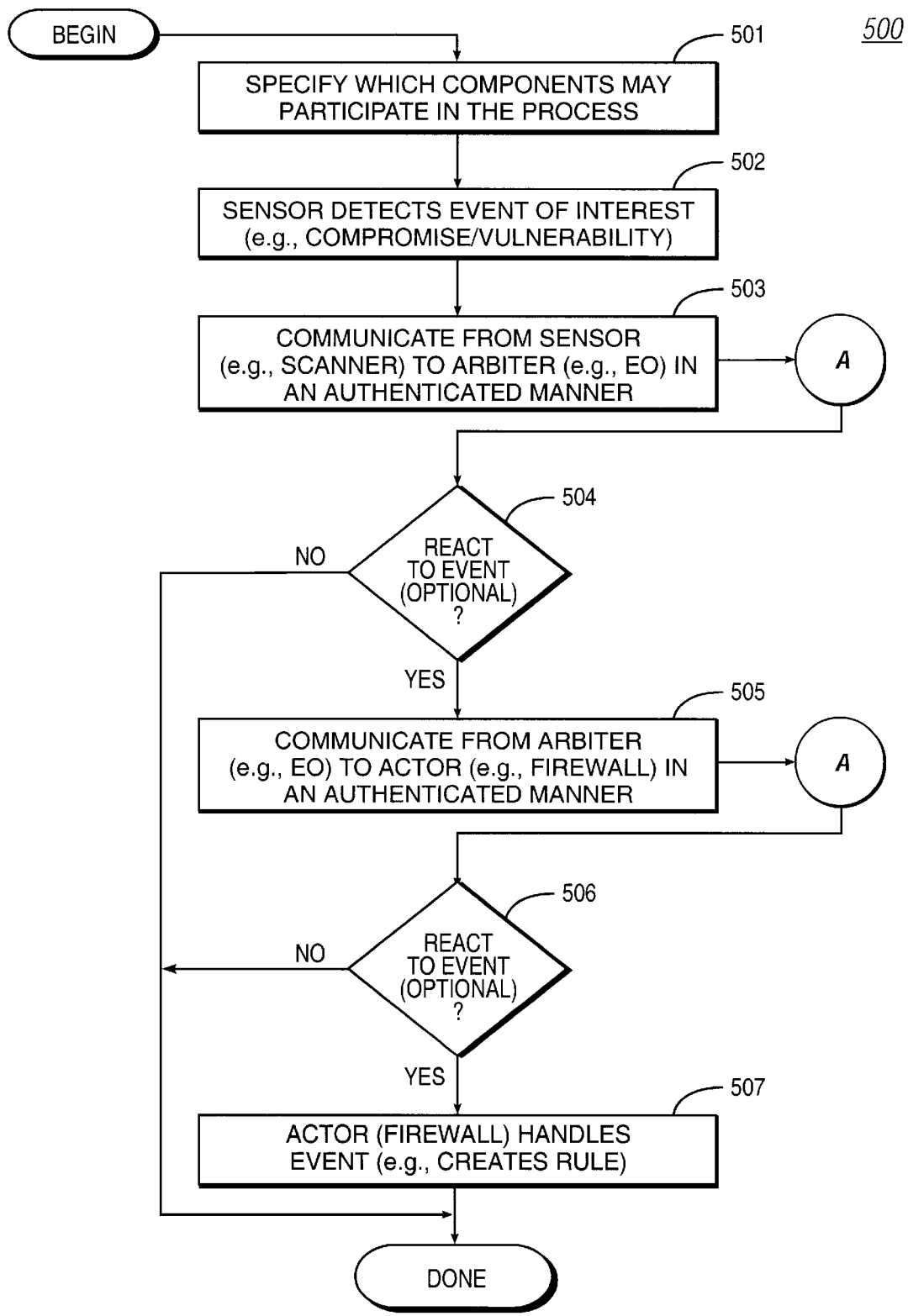
FIGS. 5A–B comprise a flowchart illustrating a method of the present invention for providing "active firewall" protection for a computer network, which includes authenticated communication between software components.
Figure 5B:
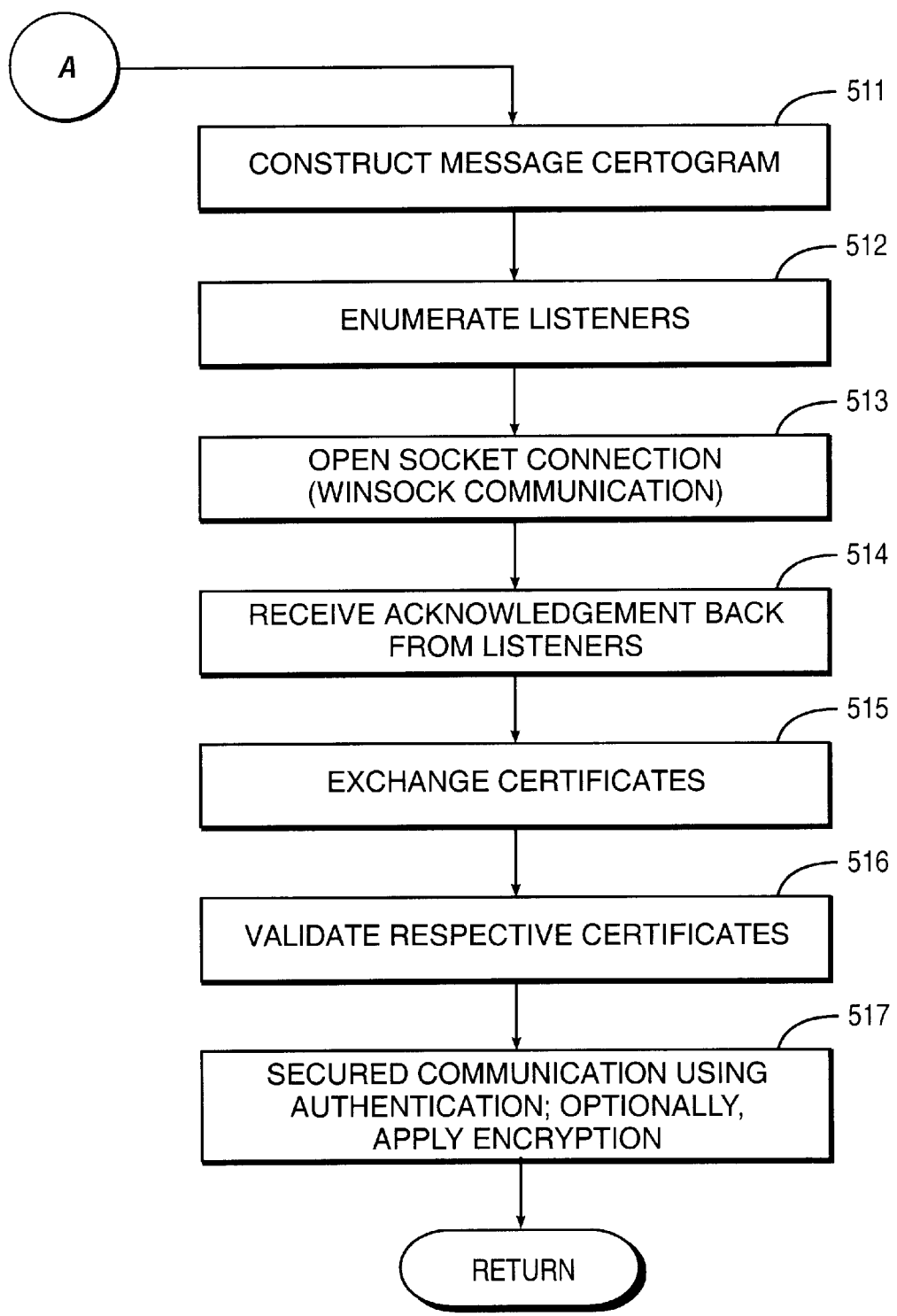

Referring now to FIGS. 5A–B, the overall methodology of the present invention may be summarized by a flowchart 500, which includes the following method steps. Step 501 indicates that, at the outset, the system is invoked with the context that the system has been configured by a system administrator for specifying which components of the system may participate in the process. Step 502 indicates an occurrence of an event of interest in the system, such as a sensor (e.g., scanner) detecting a compromise or vulnerability in the system. As a result of occurrence of the event, there now exists a need for one component (i.e., the sensor) to communicate in a secure, authenticated manner with another component (e.g., the arbiter or Event Orchestrator). Because of the configuration at step 501, the Public Key Infrastructure of the system already stores in its repository signed digital certificates (i.e., signed by the system administrator) for the two components, so that the components can engage in a digital conversation (i.e., communication session).

Now, at step 503, the sensor—acting as a "sender"—invokes the following substeps 511–517 for effecting authenticated communication with one or more listeners. As step 511, the sender creates a "certogram"—that is, a packet of information describing the event which is organized into a format suitable for transmission. In the currently-preferred embodiment, a certogram may be constructed using attribute/value pairs in plain text, such as <attribute>=<value>, with a delimiter employed for separating one pair from the next. At step 512, the sender determines which component(s) are its listeners. This determination is performed by simply enumerating those component(s) that have been specified in the system configuration to be listeners for this scanner. The components in the system may be specified by an IP (Internet Protocol) address or other identification scheme.

Step 513 illustrates the establishment of a socket connection. In the currently-preferred embodiment, this is performed through PGPTM TLS using a sequence of API (application programming interface) calls into the PGPsdk™ run-time library, as illustrated in Appendix A. Here, the component opens a socket connection (communication to a particular IP address on a particular port), binds that to a session, and then broadcasts a message to that port announcing its presence. At this point in the process, the communication socket is simply a conventional stream socket; communication is not yet authenticated. If a listener is present, the listener will respond with an acknowledgment accepting the socket connection. The receipt of an acknowledgment back from one or more listeners is indicated by step 514. Now that the communication layer is established, the method may proceed to the next step, for exchanging certificates with the listener(s), as indicated by step 515.

At step 516, the respective sender/listener(s) components each validate the certificate received from the other. Validation may proceed in a conventional manner, for example using X.509 validation, including determining the level of trust and validity (including, for instance, the expiration, revocation, and disablement) of a given certificate. X.509 validation technique itself is documented in the technical literature. See, for example, the following RFC (Request for Comments) documents: RFC2459, RFC2585, RFC2559, RFC2552, RFC2538, RFC2528, RFC2527, RFC2511, RFC2510, and RFC2246, presently available on the Internet at http://www.faqs.org/rfcs/. The disclosures of the foregoing are hereby incorporated by reference.

If each respective component is able to successfully validate the certificate received from the other, secure communication ensues. From that point on, communication occurs in a secure, authenticated manner, with each message or blob being digitally signed or fingerprinted, for instance, using a cryptographic hash or message digest. This is indicated by step 517. Any alteration to the message breaks the digital fingerprint and, therefore, may easily be detected. If desired, encryption may also be (optionally) applied to the communication messages. In those embodiments intended for export from the United States, however, encryption may be limited (e.g., as to key length) or removed.

Returning back to step 504, the listener(s) decides whether to react to (e.g., act on, pass on, and/or otherwise process) the event reported by the certogram, or simply to ignore it. If the event is not to be acted on or otherwise processed, the method is done. Typically, however, the reported event maps to a script-defined event handler (e.g., illustrated in Appendix B below) in the listener (e.g., Event Orchestrator or EO) which, in turn, desires to notify yet another listener, the actor (e.g., firewall). Communication may therefore continue with the arbiter (EO) communicating with the target actor(s) in an authenticated manner in step 505. As before, substeps 511–517 are invoked, this time with the arbiter (EO) as the sender and the actor (firewall) as the listener. The actor or firewall, upon receiving the certogram, may now (optionally) react to the event (i.e., undertake appropriate action), such as dynamically creating or modifying rules for appropriately handling the event, or it may choose to ignore the event (e.g., if the event is a duplicate of a previous event or if the event is covered by (or is a sub-set of) an existing firewall rule).

Although not shown as a separate step, in a preferred embodiment it is preferable to have the event first "filtered" through the arbiter (e.g., EO) as the sensor (e.g., scanner) will typically detect a multitude of events, many of which are not of interest to the actor (e.g., firewall). The extra level of filtering and correlation may be based on a company's security policy. Here, the company's security policy may be implemented as a script at the EO. Also, the extra level of filtering minimizes the reconfiguration of the firewall which, as it typically executes at ring 0 (i.e., highest privileged process), is often a computationally-expensive operation. In this manner, the firewall is not distracted from its main task of filtering communication packets. Note that this step replaces the present-day human step of reporting a network vulnerability to one's manager who, in turn, must then create a new firewall rule for addressing the vulnerability.

Appended herewith as Appendix A are annotated C/C++ source code listings providing further description of the present invention. A suitable development environment (compiler/linker) for compiling the source code is available from a variety of vendors, including Microsoft Visual C++ (available from Microsoft Corporation of Redmond, Wash.). Also appended herewith as Appendix B are annotated Visual Basic™ source code listings illustrating implementation of an exemplary handler routine for providing further description of the present invention. A suitable development environment (compiler/linker) for compiling the source code is Microsoft Visual Basic™ (available from Microsoft Corporation of Redmond, Wash.); however, the Visual Basic scripts for the Event Orchestrator may themselves be created with a text editor.

Further description of the network security system of the present invention is available in the documentation accompanying the commercial embodiment of the present invention, Network Associates'Gauntlet™ Active Firewall, which includes Gauntlet™ Firewall v5.0 (Windows NT and Solaris), CyberPatrol™, Telemate.Net QuickView Reporting, CyberCop™ Scanner v5.0, Event Orchestrator v1.0.2 (WinNT), Net Tools PKI Server v1.0 (Windows NT, DSA and RSA+DSA versions), Gauntlet™ VPN v5.0 (Windows NT and Solaris), and CyberCop™ Monitor v2.0 (when available), WebShield SMTP (Solaris v3.1.6, Windows NT v4.0.2). Gauntlet™ Active Firewall is available from Network Associates, Inc. of Santa Clara, Calif. (e.g., Part Nos./SKUs GAF-DRCT-NA-500-P, GAF-DRCT-NA-500-S1, and GAF-DRCT-NA-500-S), the disclosure of which is hereby incorporated by reference.

While the invention is described in some detail with specific reference to a single-preferred embodiment and certain alternatives, there is no intent to limit the invention to that particular embodiment or those specific alternatives. Thus, the true scope of the present invention is not limited to any one of the foregoing exemplary embodiments but is instead defined by the appended claims.

APPENDIX A

```
//
// Function:    CClient::PGPCreate( )
//
// Description: This function creates the "sending" connection for Active
//              Security. This function is used by the "sending" or "client"
//              device (in Winsock terminology).
//
//              In short this function does the work of calling to a server,
//              opening a "client" or 'sending" connection AND do all the work
//              proving that the two ends of this connection are properly
//              Authenticated as per X.509 regulations.
//
// Procedure:
//              1) we initialize the PGP SDK (creates memory, ensures enough
//                 available entropy, creates all TLS needed by socket.
//
//              2) we initialize a PGP Socket connection with the
//                 Authentication-only cipher suite. We could add an encryption
//                 cipher at this point.
//
//              3) we open up our local Key-Ring files and find the private key
//                 which matches the private key we installed AS with (stored as a
//                 byte string)
//
//              4) we open the socket
//
//              5) we establish a conection with the "server" or "listening"
//                 socket
//
//              6) we create an in-memory "key-chain-set" with which we'll present
//                 (and exchange) our credentials with the remote (as yet) un-
//                 authenticated machine.
//
//                 This includes extracting the X.509 Signature Reference.
//
//              7) we call ValidateClientKey( ) which:
//
//                 a) exchanges with the server our private key
//
//                 b) verifies that our private X.509 material has not been
//                    revoked by checking the CRL (Certificate Revocation List)
//
//                 c) verifies the authenticity of the remote key-pair
//
//                 d) verifies the PGP "validity" of the exchanged keys, this
//                    includes internal states such as PGP Validity, Expiration
//                    and so forth.
//
//              8) if all is well (we have an authenticated connection) return 0
//
//
//
PGPError CClient::PGPCreate( )
{
    auto   PGPError                 pgpErr
           = kPGPError_NoErr;
    auto   PGPUInt32                pgpui32InetAddr
        =  0;
    auto   PGPInt32                 pgpi32SockRes
        =  0;
    auto   PGPSocketAddressInternet      pgpSockAddrIPSrv
        = {0};
    auto   PGPHostEntry*            hostEntry
           = NULL;
    auto   PGPSigRef                keySig
           = kInvalidPGPSigRef;
    auto   PGPKeySetRef             certChainKeySet
        =  kInvalidPGPKeySetRef;
    auto   PGPKeyRef                sigKey
           = kInvalidPGPKeyRef;
    // [Initialize the PGPsdk
                                    ]
    //
    m_pgpKSRefCli   = kInvalidPGPKeySetRef;
    m_pgpPrvKRefCli = kInvalidPGPKeyRef;
    // [Do some PGP initialization
                                    ]
```

APPENDIX A-continued

```
//
pgpErr = PGPsdkInit( );
if( IsPGPError( pgpErr ) )
    {
    Logger::Log(IDS_FAILPGPSDKINIT,EVENTLOG_ERROR_TYPE);
    goto _Done_PGPCreate;
    }
pgpErr = PGPsdkNetworkLibInit( );
if( IsPGPError( pgpErr ) )
    {
    Logger::Log(IDS_FAILPGPSDKNETLIBINIT,EVENTLOG_ERROR_TYPE);
    goto _Done_PGPCreate;
    }
pgpErr = PGPsdkUILibInit( );
if( IsPGPError( pgpErr ) )
    {
    Logger::Log(IDS_FAILPGPSDKUILIBINIT,EVENTLOG_ERROR_TYPE);
    goto _Done_PGPCreate;
    }
pgpErr = PGPSocketsInit( );
if( IsPGPError( pgpErr ) )
    {
    Logger::Log(IDS_FAILPGPSDKSOCKINIT,EVENTLOG_ERROR_TYPE);
    goto _Done_PGPCreate;
    }
pgpErr = PGPSocketsCreateThreadStorage( &m_pgpSTSRefCli );
if( IsPGPError( pgpErr ) )
    {
    Logger::Log(IDS_FAILPGPSDKTHREADSTOREINIT,EVENTLOG_ERROR_TYPE);
    goto _Done_PGPCreate;
    }
// [Create a m_pgpConRefCli for all PGPsdk calls
                              ]
//
pgpErr = NewContext( &m_pgpConRefCli );
if( IsPGPError( pgpErr ) )
    {
    Logger::Log(IDS_FAILPGPSDKNEWCONTEXT,EVENTLOG_ERROR_TYPE);
    goto _Done_PGPCreate;
    }
// [Open our key rings read-only
                              ]
//
pgpErr =
PGPNewFileSpecFromFullPath(m_pgpConRefCli,m_szPubKRFNameCli,&m_pubKFSRefCli);
    if( IsPGPError( pgpErr ) )
        goto _Done_PGPCreate;
    pgpErr =
PGPNewFileSpecFromFullPath(m_pgpConRefCli,m_szPrivKRFNameCli,&m_prvKFSRefCli);
    if( IsPGPError( pgpErr ) )
        goto _Done_PGPCreate;
    pgpErr = PGPOpenKeyRingPair( m_pgpConRefCli
                    ,0
                    ,m_pubKFSRefCli
                    ,m_prvKFSRefCli
                    ,&m_pgpKSRefCli );
    if( IsPGPError( pgpErr ) )
        {
        Logger::Log(IDS_FAILPGPOPENKRPAIR,EVENTLOG_ERROR_TYPE);
        goto _Done_PGPCreate;
        }
    // [Locate our private key. We assume that it is the only private key in the
key]
    // [ring.
                              ]
    //
    pgpErr = GetFirstPrivateKeyInSet( m_pgpKSRefCli, &m_pgpPrvKRefCli );
    if( IsPGPError( pgpErr ) )
        {
        Logger::Log(IDS_FAILPGPGET1STPRIVKEY,EVENTLOG_ERROR_TYPE);
        goto _Done_PGPCreate;
        }
    // [Create a TLS m_pgpConRefCli for all network calls. This needs to be done
]
    // [only once per app instance (that was the comment) ????
                ]
    //
    pgpErr = PGPNewTLSContext( m_pgpConRefCli, &m_pgpTlsConRefCli );
    if( IsPGPError( pgpErr ) )
```

APPENDIX A-continued

```
        {
        Logger::Log(IDS_FAILPGPNEWTLSCONTEXT,EVENTLOG_ERROR_TYPE);
        goto _Done_PGPCreate;
        }
    // [Create a TLS session for this connection. This needs to be done
    once per ]
    // [connection.
                        ]
    //
    pgpErr = PGPNewTLSSession( m_pgpTlsConRefCli, &m_pgpTlsSessRefCli );
    if( IsPGPError( pgpErr ) )
        {
        Logger::Log(IDS_FAILPGPNEWTLSSESS,EVENTLOG_ERROR_TYPE);
        goto _Done_PGPCreate;
        }
    // [Setup options on the TLS session
                        ]
    //
    pgpErr = PGPtlsSetProtocolOptions( m_pgpTlsSessRefCli,kPGPtlsFlags_ClientSide );
    if( IsPGPError( pgpErr ) )
        {
        Logger::Log(IDS_FAILPGPSETPROTOCOLOPT,EVENTLOG_ERROR_TYPE);
        goto _Done_PGPCreate;
        }
    pgpErr = MakeCertChainKeySet (m_pgpConRefCli
                    ,m_pgpKSRefCli
                    ,&certChainKeySet
                    ,m_szRootCertKeyIdString
                    ,m_szProdCertKeyIdString
                    ,m_szPubKRFNameCli);
    if( IsPGPError( pgpErr ) )
        {
        Logger::Log(IDS_FAILPGPMAKECERTCHAINKEYSET,EVENTLOG_ERROR_TYPE);
        goto _Done_PGPCreate;
        }
    pgpErr = GetX509SigRef (certChainKeySet, &keySig,&sigKey);
    if( IsPGPError( pgpErr ) )
        {
        Logger::Log(IDS_FAILPGPGETX509SIGREF,EVENTLOG_ERROR_TYPE);
        goto _Done_PGPCreate;
        }
    pgpErr = PGPtlsSetLocalPrivateKey( m_pgpTlsSessRefCli
                    ,sigKey
                    ,keySig
                    ,certChainKeySet
                    ,PGPOPassphrase ( m_pgpConRefCli,
(LPCSTR)m_szPassPhrase )
                    ,PGPOLastOption( m_pgpConRefCli ) );
    if( IsPGPError( pgpErr ) )
        {
        Logger::Log(IDS_FAILPGPSETLOCALPRIVATEKEY,EVENTLOG_ERROR_TYPE);
        goto _Done_PGPCreate;
        }
    // [Set authentication suite only
                ]
    //
    pgpErr = PGPtlsSetPreferredCipherSuite(
m_pgpTlsSessRefCli,kPGPtls_TLS_DHE_DSS_WITH_NULL_SHA );
    // [open the new socket and get a "template" socket reference . . .
            ]
    //
    m_pgpSocRefCli = PGPOpenSocket(
kPGPAddressFamilyInternet,kPGPSocketTypeStream,kPGPTCPProtocol );
    //
    if( !PGPSocketRefIsValid( m_pgpSocRefCli ) )
        {
        pgpErr = PGPGetLastSocketsError( );
        Logger::Log(IDS_FAILPGPOPENSOCKET,EVENTLOG_ERROR_TYPE);
        goto _Done_PGPCreate;
        }
    // [Lookup our server
                ]
    //
    pgpui32InetAddr = PGPDottedToInternetAddress( m_szSrvrIPAddr );
    if( pgpui32InetAddr != kPGPSockets_Error )
        {
        hostEntry = PGPGetHostByAddress((char*)&pgpui32InetAddr
                    ,sizeof( PGPInternetAddress )
                    ,kPGPProtocolFamilyInternet );
```

APPENDIX A-continued

```
        }
    else
        {
        hostEntry = PGPGetHostByName( m_szSrvrIPAddr );
        }
    pgpSockAddrIPSrv.sin_family   = kPGPAddressFamilyInternet;
    pgpSockAddrIPSrv.sin_port     = PGPHostToNetShort( m_pgpi16SrvPort );
    // [If we were able 2 get the hostentry, use the IP address list from that. If
    ]
    // [not,use the IP address passed in by the caller.
                ]
    //
    if( hostEntry != NULL )
        {
        pgpSockAddrIPSrv.sin_addr = * ( (PGPInternetAddress*)
*hostEntry—>h_addr_list);
        }
    else
        {
        pgpSockAddrIPSrv.sin_addr = * ( (PGPInternetAddress*) &pgpui32InetAddr);
        }
    pgpi32SockRes = PGPConnect( m_pgpSocRefCli
                ,(PGPSocketAddress *) &pgpSockAddrIPSrv
                ,sizeof( pgpSockAddrIPSrv ) );
    if( pgpi32SockRes != kPGPSockets_Error )
        {
        // [Bind our TLS info to the m_pgpSocRefCli
                    ]
        //
        pgpErr = PGPSocketsEstablishTLSSession ( m_pgpSocRefCli, m_pgpTlsSessRefCli
);
        }
    else
        {
        Logger::Log(IDS_FAILPGPCONNECT,EVENTLOG_ERROR_TYPE);
        }
    if( IsntPGPError( pgpErr ) )
        {
        pgpErr = ValidateClientKey( m_pgpTlsSessRefCli );
        }
    else
        {
        Logger::Log(IDS_FAILPGPSOCKESTSESS,EVENTLOG_ERROR_TYPE);
        }
_Done_PGPCreate:
    if( certChainKeySet != NULL )
        PGPFreeKeySet ( certChainKeySet );
    return pgpErr;
}
//

// Function: CClient::ValidateClientKey( )
//
// Description:
//      Get the client's key and validate it. There are three ways to validate the
//      key. First, we can lookup the key in a list of known keys maintained by
//      the server. Second, we can directly validate the key is signed by a known
//      key. Third, we can trust a known CA key and check the validity of the
//      client key. If it is valid, it has been signed by the CA key or another
//      trusted key. We're employing method three here.
//
// Procedure:
//
//      1) Get the remote machine's client key.
//
//      2) Check that the key has not expired or is in some way invalid/disabled
//
//      3) do the PGP work of determining if all the things that will make this KR
//         pair acceptable (enough for an authenticated connection)
//
//      4) If the validity of the key does not meet ALL our criteria then we'll log
//         this as an unacceptable connection.
//
//      5) or else return all is well.
//
//

//
PGPError CClient::ValidateClientKey(PGPtlsSessionRef tlsSR)
```

APPENDIX A-continued

```
{
    auto    PGPError        pgpErr          = kPGPError_NoErr;
    auto    PGPKeyRef       clientKey       = kInvalidPGPKeyRef;
    auto    PGPKeySetRef    clientSetKey    = kInvalidPGPKeySetRef;
    auto    PGPBoolean      isExpired;
    auto    PGPBoolean      isRevoked;
    auto    PGPBoolean      isDisabled;
    pgpErr = PGPtlsGetRemoteAuthenticatedKey( tlsSR, &clientKey,&clientSetKey );
    //
    if( IsntPGPError( pgpErr ) )
        {
        // Validate the key is not expired, revoked, etc
        //
        pgpErr = PGPGetKeyBoolean( clientKey, kPGPKeyPropIsRevoked, &isRevoked );
        if( IsntPGPError( pgpErr ) )
            {
            pgpErr = PGPGetKeyBoolean( clientKey
                            ,kPGPKeyPropIsExpired
                            ,&isExpired );
            if( IsntPGPError( pgpErr ) )
              {
              pgpErr = PGPGetKeyBoolean( clientKey
                            ,kPGPKeyPropIsDisabled
                            ,&isDisabled);
              }
            }
        if( IsntPGPError( pgpErr ) )
            {
            if( isExpired || isRevoked || isDisabled )
                {
                Logger::Log(IDS_CERTISNOTVALID,EVENTLOG_ERROR_TYPE);
                pgpErr = kPGPError_ServerAuthorizationFailed;
                }
            }
        if( IsntPGPError( pgpErr ) )
            {
            auto    PGPKeySetRef    combinedSet
   = kInvalidPGPKeySetRef;
            // Create a combined key set for computing validity
            //
            pgpErr = PGPNewKeySet( m_pgpConRefCli, &combinedSet );
            if( IsntPGPError( pgpErr ) )
                {
                auto    PGPKeySetRef    clientKeySet
   = kInvalidPGPKeySetRef;
                pgpErr = PGPNewSingletonKeySet( clientKey, &clientKeySet );
                if( IsntPGPError( pgpErr ) )
                  {
                  pgpErr = PGPAddKeys( m_pgpKSRefCli, combinedSet );
                  if( IsntPGPError( pgpErr ) )
                    {
                    pgpErr = PGPAddKeys( clientKeySet, combinedSet );
                    if( IsntPGPError( pgpErr ) )
                      {
                      pgpErr = PGPCheckKeyRingSigs( combinedSet,
                            combinedSet, FALSE, NULL, 0);
                      if( IsntPGPError( pgpErr ) )
                        {
                        pgpErr = PGPPropagateTrust( combinedSet );
                        }
                      }
                    }
                  }
                // We now have a set containing the remote key and all trust and
validity
                // computation has been done. Get the validity of the remote key
and error
                // if it is not completely valid
                //
                if( IsntPGPError( pgpErr ) )
                  {
                  auto    PGPInt32    validity;
                  pgpErr = PGPGetKeyNumber ( clientKey, kPGPKeyPropValidity,
&validity );
                  if( IsntPGPError( pgpErr ) )
                    {
                    if( (PGPValidity) validity != kPGPValidity_Complete )
                      {
                      Logger::Log(IDS_CERTISNOTVALID,EVENTLOG_ERROR_TYPE);
                      pgpErr = kPGPError_ServerAuthorizationFailed;
```

APPENDIX A-continued

```
                }
            }
        }
        PGPFreeKeySet( clientKeySet );
    }
    PGPFreeKeySet ( combinedSet );
        }
    }
}
//      PGPFreeKeySet( clientSetKey );
}
    if( IsntPGPError( pgpErr ) )
        Logger::Log(IDS_CERTISVALID,EVENTLOG_INFORMATION_TYPE);
    return( pgpErr );
}
//

// Function: PGPTimedSockets::TimedAccept( )
// Description:
//      This function is used by the server or "listening" Active Security device.
//      This mechanism allows multiple simultaneous attempts at connection to the
//      listener.
//
//      This function is part of a multi-threaded procedure launched when the
//      Listener is created.
//
// Procedure:
//
//      1) Depending on whether we're instructed to wait forever or not we setup
//         waiting-state structures that dictate how we will accept sockets.
//
//      2) We select any found open waiting socket
//
//      3) We accept same
//
//
// Remarks:
//      This function merely "accepts" a "standard" socket connection. This is not
//      where we determine the authenticity/acceptability of the connection. This
//      function will accept ANY Winsock compliant requests to connect to this
//      Listener.
//
//      It is not until later when we will do all the cryptography to determine if
//      the remote machine has the proper X.509 and Active Security credentials to
//      keep connection alive.
//
//      NO ACTIVE SECURITY DATA CAN BE TRANSFERED ON THIS CONNECTION JUST BECAUSE WE
//      ACCEPT IT. THIS CONNECTION STILL MUST BE AUTHENTICATED BEFORE THIS "STREAM"
//      IS MADE AVAILABLE TO THE SECURECOMM API'S.
//
//

//
PGPSocketRef PGPTimedSockets::TimedAccept(PGPSocketRef socket, long timeout,
PGPError &err)
{
    PGPSocketSet readSet;
    PGPSocketRef currSock;
    PGPSocketsTimeValue timeOut;
    PGPSOCKETSET_ZERO(&readSet);
    PGPSOCKETSET_SET (socket, &readSet);
    if (timeout == INFINITE)
        err = PGPSelect(FD_SETSIZE,&readSet,NULL,NULL,NULL);
    else
    {
        timeOut.tv_sec = (long) (timeout/1000);
        timeOut.tv_usec = (long)0;
        err = PGPSelect(FD_SETSIZE,&readSet,NULL,NULL,&timeOut);
    }
    if (!err)
    {
        err = SOCKET_TIME_OUT;
        return 0;
    }
    if (err == 1)
    {
        currSock = PGPAccept(socket,NULL,NULL);
        if(currSock == NULL || (PGPInt32) currSock == kPGPSockets_Error)
            err = INVALID_SOCKET;
        else
```

APPENDIX A-continued

```
        err = 0;
    }
    return currSock;
}
```

APPENDIX B

| | |
|---|---|
| ' File: | CertogramMHD.vbs |
| ' Version: | 1.0 |
| ' Last Modified: | April 5, 1999 |
| ' Written By: | Network Associates, Inc. |
| ' Copyright: | 1999 Network Associates, Inc. All rights reserved. |

```
'
' Description:
' This script will populate a McAfee HelpDesk (MHD) trouble ticket with information
' about a vulnerability detected by CyberCop Scanner. This is performed by
' extracting information from variables associated with an incoming Certogram and
' creating a customizable string variable, NOTE. This variable is used by the MHD
' Action Server in Event Orchestrator to populate the "Action Note" of a trouble
' ticket.
' Note:   Network Associates recommends that you use these scripts during the
'         "Generate" stage vs. the "Process" stage within Event Orchestrator for
'         optimal perfomance.
' Extract the product name and version that found the security issue
strProductID = EventObject.GetData ("CG_PRODUCT_VERSION")
' Extract the vulnerability ID, severity of the problem and what action is
' recommended by the product that detected the vulnerability
strVulCode = EventObject.GetData ("CG_VULNERABILITY_ID")
strSeverity = EventObject.GetData ("CG_SEVERITY")
strAction = EventObject.GetData ("CG_ACTION")
' Extract the IP address, port number and protocol ID associated with the system
' which has the vulnerability
strMachine = EventObject.GetData ("CG_MACHINE")
strPort = EventObject.GetData ("CG_PORT")
strProtocol = EventObject.GetData ("CG_PROTOCOL_ID")
' Extract information about the vulnerability, including suggestions on how to fix
it
strShortDescription = EventObject.GetData ("CG_SHORT_DESCRIPTION")
strLongDescription = EventObject.GetData ("CG_VULNERABILITY_DESCRIPTION")
strConcerns = EventObject.GetData ("CG_SECURITY_CONCERNS")
strSuggestions = EventObject.GetData ("CG_SUGGESTIONS")
strOtherSources = EventObject.GetData ("CG_OTHER_INFORMATION_SOURCES")
' Build string to be placed in the "Action Note" field of MHD trouble ticket
CRLF = Chr(13) + Chr(10)
strNote = "** ATTENTION **" + CRLF
strNote = strNote + "** " + strProductID + " detected a security vulnerability (" +
strVulCode + ") in the network. **" + CRLF + CRLF
strNote = strNote + "_____" + CRLF
strNote = strNote + "HOST INFORMATION" + CRLF
strNote = strNote + "IP Address: " + strMachine + CRLF
strNote = strNote + "Port Number: " + strPort + CRLF + CRLF
strNote = strNote + "_____" + CRLF
strNote = strNote + "INCIDENT INFORMATION" + CRLF
strNote = strNote + "The severity was: "
' Determine severity of event and include it in the trouble ticket
if (strSeverity = "2") then
   strNote = StrNote + "HIGH" + CRLF
elseif (strSeverity = "1") then
   strNote = StrNote + "MEDIUM" + CRLF
elseif (strSeverity = "0") then
   strNote = StrNote + "LOW" + CRLF
end if
strNote = strNote + "The action code was: BLOCK PORT" + CRLF
strNote = strNote + "The protocol used was: "
' Determine which protocol the vulnerability is associated with and include it in
the trouble ticket
if (strProtocol = "0") then
   strNote = StrNote + "IP" + CRLF
elseif (strProtocol = "1") then
   strNote = StrNote + "ICMP" + CRLF
elseif (strProtocol = "2") then
   strNote = StrNote + "IGMP" + CRLF
elseif (strProtocol = "3") then
   strNote = StrNote + "GGP" + CRLF
elseif (strProtocol = "6") then
   strNote = StrNote + "TCP" + CRLF
```

APPENDIX B-continued

```
elseif (strProtocol = "12") then
   strNote = StrNote + "PUP" + CRLF
elseif (strProtocol = "17") then
   strNote = StrNote + "UDP" + CRLF
end if
' Insert information about the vulnerability into the trouble ticket
strNote = strNote + "_____" + CRLF
strNote = strNote + "VULNERABILITY INFORMATION" + CRLF
strNote = strNote + "Short Description:" + CRLF
strNote = strNote + strShortDescription + CRLF + CRLF
strNote = strNote + "Vulnerability Description:" + CRLF
strNote = strNote + strLongDescription + CRLF + CRLF
strNote = strNote + "Security Concerns:" + CRLF
strNote = strNote + strConcerns + CRLF + CRLF
strNote = strNote + "Suggestions:" + CRLF
strNote = strNote + strSuggestions + CRLF + CRLF
strNote = strNote + "Other Information Sources:" + CRLF
strNote = strNote + strOtherSources + CRLF
' Set the "NOTE" variable so the MHD Action Server will populate the trouble ticket
EventObject.AddData "NOTE", strNote
```

What is claimed is:

1. In a computer network system comprising a plurality of software components, a method for providing network security using authenticated communication between software components of the system, the method comprising:

specifying first, second, and third software components that may participate in authenticated communication, including creating a digital certificate for each software component;

detecting by the first component a security-related event of interest that occurs in the system;

initiating authenticated communication between the first software component and the second software component, so that the first software component may report the event to the second software component;

initiating authenticated communication between the second software component and the third software component, so that the second software component may indicate to the third software component how to handle the event; and handling the event at the third software component in the manner indicated by the second software component, so that the event is automatically handled by the system.

2. The method of claim 1, wherein each of the software components operates on a separate computer connected to the computer network system.

3. The method of claim 1, wherein said specifying step includes:

receiving input from a user having system administrator privileges specifying which software components may participate in authenticated communication.

4. The method of claim 3, wherein said input includes:

digitally signing a digital certificate of each software component permitted to participate in authenticated communication with a digital certificate for the user having system administrator privileges.

5. The method of claim 1, wherein authenticated communication is initiated between components by:

exchanging digital certificates of the respective software components, and if the digital certificate of each respective software component has been signed by an entity that the other software component trusts, establishing authenticated communication between the two software components.

6. The method of claim 5, wherein each digital certificate created is stored in a central repository.

7. The method of claim 1, wherein authenticated communication provided by the method includes:

associating a digital fingerprint with each message that occurs during authenticated communication.

8. The method of claim 7, wherein said digital fingerprint includes a cryptographic hash.

9. The method of claim 7, wherein said digital fingerprint includes a message digest.

10. The method of claim 7, wherein the digital fingerprint for a given message is based, at least in part, on a digital certificate for the respective component that created the given message.

11. The method of claim 7, wherein authenticated communication provided by the method includes:

authenticating a given message of the authenticated communication using the digital fingerprint specifically computed for the given message.

12. The method of claim 1, further comprising:

encrypting communication between the software components.

13. The method of claim 12, wherein said step of encrypting communication includes:

encrypting messages from one component to a digital certificate for the other component.

14. The method of claim 1, wherein information about an event occurring in the system is transmitted as a certogram.

15. The method of claim 14, wherein each certogram comprises information organized into attribute/value format.

16. The method of claim 1, wherein authenticated communication provided by the method includes:

validating a digital certificate for each component participating in authenticated communication.

17. The method of claim 16, wherein said validating step includes determining selected ones of expiration, revocation, and disablement for each digital certificate being validated.

18. The method of claim 1, wherein the second software component includes an event handler for instructing the third software component how to appropriately handle the event.

19. The method of claim 1, wherein said event occurring in the system comprises a detected vulnerability.

20. The method of claim 19, wherein said system includes a firewall as said third component and wherein said event handler instructs the firewall to create a new firewall rule for appropriately handling the detected vulnerability.

21. A method for providing automated network security for a network system, the method comprising:
   providing a configurable firewall capable of limiting access to the network system, a sensor for detecting vulnerabilities in the network system, and an arbiter for specifying reconfiguration of the firewall for handling vulnerabilities detected by the sensor;
   specifying that the firewall, the sensor, and the arbiter may participate in authenticated communication;
   detecting by the sensor a particular vulnerability in the network system;
   establishing an authenticated communication session between the sensor and the arbiter for transmitting information about the particular vulnerability from the sensor to the arbiter; and
   establishing an authenticated communication session between the arbiter and the firewall for transmitting instructions for handling the particular vulnerability from the arbiter to the firewall, such that the particular vulnerability may be handled in an automated manner.

22. The method of claim 21, wherein the firewall, the sensor, and the arbiter each operates on a separate computer connected to the network system.

23. The method of claim 21, wherein said specifying step includes:
   receiving input from a user having system administrator privileges specifying which particular components in the system may participate in authenticated communication.

24. The method of claim 23, wherein said specifying step further includes:
   creating a digital certificate for the user having system administrator privileges and creating a digital certificate for each component that is permitted to participate in authenticated communication;
   digitally signing the digital certificate of each component permitted to participate in authenticated communication with the digital certificate for the user having system administrator privileges.

25. The method of claim 24, wherein each digital certificate comprises a PGP-compatible key.

26. The method of claim 23, wherein each digital certificate created is stored in a central repository.

27. The method of claim 21, wherein authenticated communication is established between components by authenticating messages communicated between those components using digital fingerprints.

28. The method of claim 27, wherein each digital fingerprint comprises a cryptographic hash.

29. The method of claim 27, wherein each digital fingerprint comprises a message digest.

30. The method of claim 27, wherein the digital fingerprint for a given message is based, at least in part, on a digital certificate of the respective component that created the given message.

31. The method of claim 27, wherein authenticated communication is established between components by authenticating a given message using a digital fingerprint specifically computed for the given message.

32. The method of claim 21, further comprising:
   encrypting communication between components of the network system.

33. The method of claim 32, wherein said step of encrypting communication includes:
   encrypting messages from one component to a digital certificate created for the other component.

34. The method of claim 21, wherein said information about the particular vulnerability comprises information organized into attribute/value format.

35. The method of claim 21, wherein authenticated communication is established between two components by exchanging digital certificates of each component with the other and thereafter establishing trust and validity for each digital certificate so exchanged.

36. The method of claim 35, wherein establishing validity includes determining selected ones of expiration, revocation, and disablement for each digital certificate being validated.

37. The method of claim 21, wherein the particular vulnerability comprises detection of unauthorized access to the network system.

38. The method of claim 21, wherein the particular vulnerability comprises detection of an unauthorized mail server on the network system.

39. The method of claim 21, wherein the particular vulnerability comprises detection of an unauthorized FTP (File Transport Protocol) server on the network system.

40. The method of claim 21, wherein the particular vulnerability comprises detection of an unauthorized writeable directory on the network system.

41. A system providing automatically-reconfigurable security for a computer network, the system comprising:
   a configurable firewall component providing security to the computer network;
   a sensor component for detecting security-related events that occur in the computer network;
   an arbiter component for specifying reconfiguration of the firewall component for handling at least some of the security-related events detected by the sensor component; and
   a communication layer, configured to specify that the firewall component, the sensor component, and the arbiter component may participate in authenticated communication, so that the firewall component may be automatically reconfigured by the arbiter component to handle a particular security-related event that has been detected by the sensor component.

42. The system of claim 41, wherein the firewall component, the sensor component, and the arbiter component each operates on a separate computer connected to the computer network.

43. The system of claim 41, wherein said communication layer may be configured from input from a user having system administrator privileges that specify which particular components in the system may participate in authenticated communication.

44. The system of claim 43, wherein said system operates, in response to said input, to create a digital certificate for the user having system administrator privileges, to create a digital certificate for each component that is permitted to participate in authenticated communication, and to digitally sign the digital certificate of each component permitted to participate in authenticated communication with the digital certificate for the user having system administrator privileges.

45. The system of claim 44, wherein each digital certificate comprises a PGP-compatible key.

46. The system of claim 44, wherein each digital certificate created is stored in a central repository.

47. The system of claim 41, wherein authenticated communication is established between components by authenticating messages communicated between those components using digital fingerprints.

48. The system of claim 47, wherein each digital fingerprint comprises a cryptographic hash.

49. The system of claim 47, wherein each digital fingerprint comprises a message digest.

50. The system of claim 47, wherein the digital fingerprint for a given message is based, at least in part, on a digital certificate of the respective component that created the given message.

51. The system of claim 47, wherein authenticated communication is established between components by authenticating a given message using a digital fingerprint specifically computed for the given message.

52. The system of claim 41, wherein said communication layer provides encryption of communication between components of the system.

53. The system of claim 52, wherein encrypted messages sent to a particular component are encrypted to the public key certificate of that component.

54. The system of claim 41, wherein information about security-related events is communicated in attribute/value format.

55. The system of claim 41, wherein authenticated communication is established between two components by exchanging digital certificates of each component with the other and thereafter establishing trust and validity for each digital certificate so exchanged.

56. The system of claim 55, wherein establishing validity includes determining selected ones of expiration, revocation, and disablement for each digital certificate being validated.

57. The system of claim 41, wherein the particular security-related event comprises detection, of unauthorized access to the computer network.

58. The system of claim 41, wherein the particular security-related event comprises detection of an unauthorized mail server on the computer network.

59. The system of claim 41, wherein the particular security-related event comprises detection of an unauthorized FTP (File Transport Protocol) server on the computer network.

60. The system of claim 41, wherein the particular security-related event comprises detection of an unauthorized writeable directory on the computer network.

\* \* \* \* \*